(12) United States Patent
Diankov et al.

(10) Patent No.: US 10,618,172 B1
(45) Date of Patent: Apr. 14, 2020

(54) ROBOTIC SYSTEM WITH ERROR DETECTION AND DYNAMIC PACKING MECHANISM

(71) Applicant: MUJIN, Inc., Tokyo (JP)

(72) Inventors: Rosen Nikolaev Diankov, Tokyo (JP);
Denys Kanunikov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 16/428,809

(22) Filed: May 31, 2019

(51) Int. Cl.
*G06F 19/00* (2018.01)
*B25J 9/16* (2006.01)

(52) U.S. Cl.
CPC .......... *B25J 9/1687* (2013.01); *B25J 9/1661* (2013.01); *B25J 9/1664* (2013.01); *B25J 9/1676* (2013.01); *B25J 9/1697* (2013.01)

(58) Field of Classification Search
CPC ...... B25J 9/1687; B25J 9/1664; B25J 9/1676; B25J 9/1661; B25J 9/1697
See application file for complete search history.

(56) References Cited

U.S. PATENT DOCUMENTS

| | | | |
|---|---|---|---|
| 3,586,176 A | 6/1971 | Rackman et al. | |
| 4,692,876 A | 9/1987 | Tenma et al. | |
| 5,175,692 A | 12/1992 | Mazouz et al. | |
| 5,501,571 A | 3/1996 | Van Durrett et al. | |
| 5,908,283 A | 6/1999 | Huang et al. | |
| 6,055,462 A | 4/2000 | Sato | |
| 7,266,422 B1 | 9/2007 | DeMotte et al. | |
| 8,290,617 B2 | 10/2012 | Ruge | |
| 9,102,055 B1 | 8/2015 | Konolige | |
| 9,205,558 B1 * | 12/2015 | Zevenbergen | B25J 9/1664 |
| 9,205,562 B1 * | 12/2015 | Konolige | B25J 9/1687 |
| 9,315,344 B1 | 4/2016 | Lehmann | |
| 9,424,470 B1 * | 8/2016 | Hinterstoisser | G06K 9/00664 |
| 9,457,477 B1 * | 10/2016 | Rublee | B25J 15/0023 |

(Continued)

FOREIGN PATENT DOCUMENTS

JP 2005089067 A 7/2005

OTHER PUBLICATIONS

Non-Final Office Action dated Jul. 25, 2019 for U.S. Appl. No. 16/428,645, filed May 31, 2019, 8 pages.

(Continued)

*Primary Examiner* — Ian Jen
(74) *Attorney, Agent, or Firm* — Perkins Coie LLP

(57) ABSTRACT

A method for operating a robotic system includes determining a discretized object model based on source sensor data; comparing the discretized object model to a packing plan or to master data; determining a discretized platform model based on destination sensor data; determining height measures based on the destination sensor data; comparing the discretized platform model and/or the height measures to an expected platform model and/or expected height measures; and determining one or more errors by (i) determining at least one source matching error by identifying one or more disparities between (a) the discretized object model and (b) the packing plan or the master data or (ii) determining at least one destination matching error by identifying one or more disparities between (a) the discretized platform model or the height measures and (b) the expected platform model or the expected height measures, respectively.

20 Claims, 8 Drawing Sheets

(56) References Cited

U.S. PATENT DOCUMENTS

| | | | |
|---|---|---|---|
| 9,457,970 B1* | 10/2016 | Zevenbergen | B65G 67/02 |
| 9,688,489 B1* | 6/2017 | Zevenbergen | B65G 67/20 |
| 9,866,815 B2* | 1/2018 | Vrcelj | G06K 9/34 |
| 10,335,947 B1* | 7/2019 | Diankov | B25J 9/1664 |
| 2002/0057838 A1 | 5/2002 | Steger | |
| 2004/0120600 A1 | 6/2004 | Cho et al. | |
| 2008/0273801 A1 | 11/2008 | Podilchuk | |
| 2009/0069939 A1 | 3/2009 | Nagatsuka et al. | |
| 2010/0178149 A1 | 7/2010 | Fritzsche | |
| 2010/0222915 A1 | 9/2010 | Kuehnemann et al. | |
| 2010/0249989 A1 | 9/2010 | Baldes et al. | |
| 2013/0163879 A1* | 6/2013 | Katz | G06K 9/6202 |
| | | | 382/195 |
| 2014/0374216 A1 | 12/2014 | Pierson et al. | |
| 2015/0073588 A1 | 3/2015 | Priebe et al. | |
| 2015/0166272 A1 | 6/2015 | Pankratov et al. | |
| 2016/0016311 A1* | 1/2016 | Konolige | B25J 5/007 |
| | | | 700/245 |
| 2016/0063309 A1* | 3/2016 | Konolige | G06K 9/00201 |
| | | | 382/153 |
| 2016/0288330 A1* | 10/2016 | Konolige | H04N 13/239 |
| 2017/0267467 A1 | 9/2017 | Kimoto et al. | |
| 2018/0060765 A1 | 3/2018 | Hance et al. | |
| 2018/0312346 A1 | 11/2018 | Klotz et al. | |
| 2019/0039237 A1 | 2/2019 | Nakashima et al. | |
| 2019/0143504 A1 | 5/2019 | Kimoto | |
| 2019/0193956 A1 | 6/2019 | Morland et al. | |

OTHER PUBLICATIONS

Non-Final Office Action dated Sep. 11, 2019 for U.S. Appl. No. 16/428,714, filed May 31, 2019, 30 pages.
Non-Final Office Action dated Jul. 31, 2019 for U.S. Appl. No. 16/428,843, filed May 31, 2019, 15 pages.
Non-Final Office Action dated Aug. 2, 2019 for U.S. Appl. No. 16/428,870, filed May 31, 2019, 21 pages.
U.S. Appl. No. 16/428,645, filed May 31, 2019, Inventors: Rosen Nikolaev Diankov and Denys Kanunikov, Applicant: MUJIN, Inc.
U.S. Appl. No. 16/428,714, filed May 31, 2019, Inventors: Rosen Nikolaev Diankov and Denys Kanunikov, Applicant: MUJIN, Inc.
U.S. Appl. No. 16/428,843, filed May 31, 2019, Inventors: Rosen Nikolaev Diankov and Denys Kanunikov, Applicant: MUJIN, Inc.
U.S. Appl. No. 16/428,870, filed May 31, 2019, Inventors: Rosen Nikolaev Diankov and Denys Kanunikov, Applicant: MUJIN, Inc.

* cited by examiner

ROBOTIC SYSTEM WITH ERROR DETECTION AND DYNAMIC PACKING MECHANISM

CROSS-REFERENCE TO RELATED APPLICATION(S)

This application contains subject matter related to U.S. patent application Ser. No. 16/428,645, filed May 31, 2019, and titled "A ROBOTIC SYSTEM WITH PACKING MECHANISM," which is incorporated herein by reference in its entirety.

This application contains subject matter related to U.S. patent application Ser. No. 16,428,714, filed May 31, 2019, and titled "A ROBOTIC SYSTEM WITH DYNAMIC PACKING MECHANISM," which is incorporated herein by reference in its entirety.

This application contains subject matter related to U.S. patent application Ser. No. 16/428,843, filed May 31, 2019and titled "ROBOTIC SYSTEM FOR PROCESSING PACKAGES ARRIVING OUT OF SEQUENCE," which is incorporated herein by reference in its entirety.

This application contains subject matter related to U.S. patent application Ser. No. 16/428,870, filed May 31, 2019, and titled "ROBOTIC SYSTEM FOR PALLETIZING PACKAGES USING REAL-TIME PLACEMENT SIMULATION," which is incorporated herein by reference in its entirety.

TECHNICAL FIELD

The present technology is directed generally to robotic systems and, more specifically, to systems, processes, and techniques for dynamically packing objects based on identified errors.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

Despite the technological advancements, however, robots often lack the sophistication necessary to duplicate human sensitivity and/or adaptability required for executing more complex tasks. For example, robots often lack the granularity of control and flexibility in the executed actions to account for deviations, errors, or uncertainties that may result from various real-world factors. Accordingly, there remains a need for improved techniques and systems for controlling and managing various aspects of the robots to complete the tasks despite the various real-world factors.

DETAILED DESCRIPTION

Figure 1:
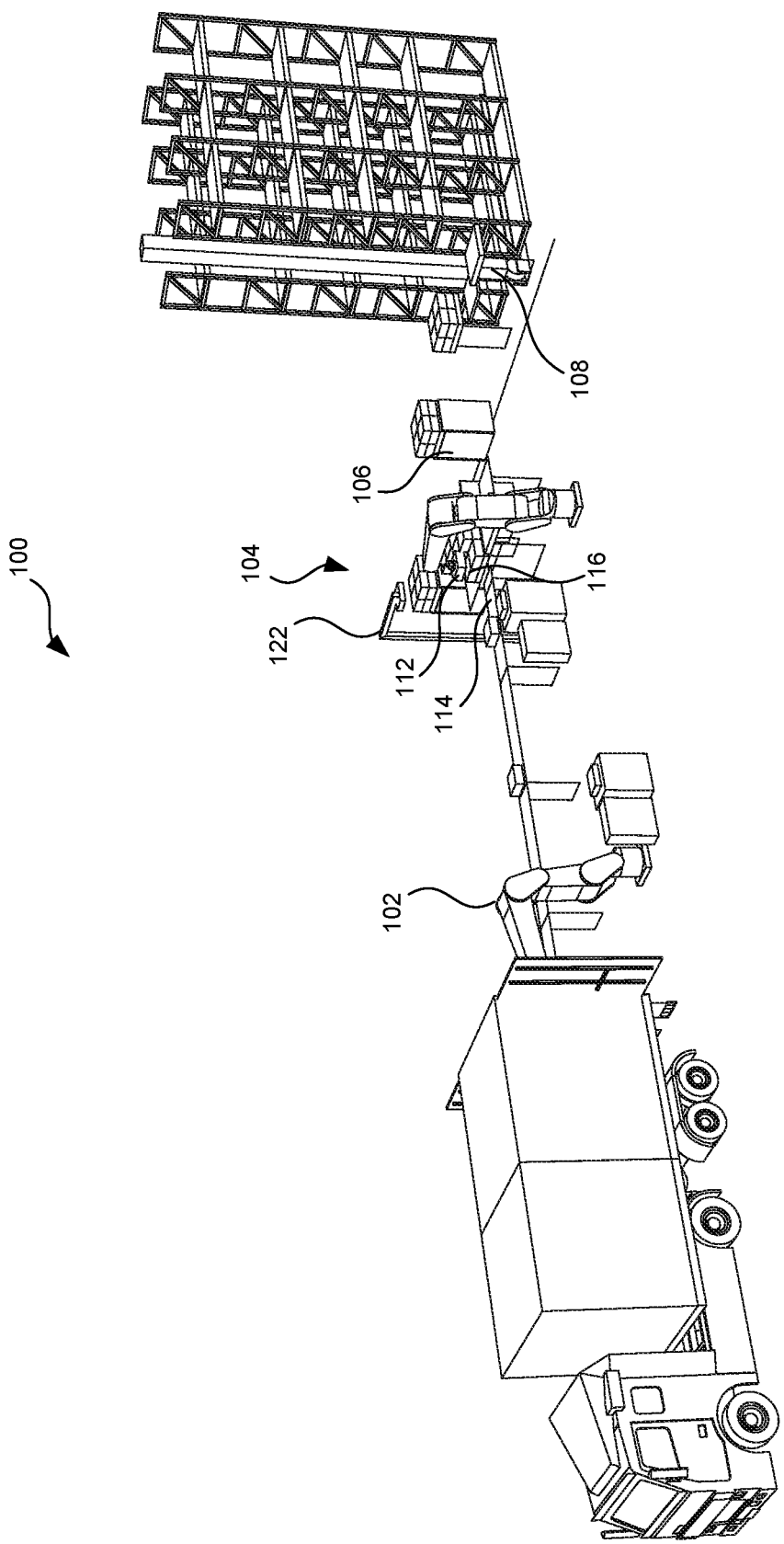
FIG. 1 is an illustration of an example environment in which a robotic system with a dynamic packing mechanism may operate.

Systems and methods for identifying various packaging errors and dynamically packing objects (e.g., packages and/or boxes) are described herein. A robotic system (e.g., an integrated system of devices that executes one or more designated tasks) configured in accordance with some embodiments provides enhanced packing and storage efficiency by dynamically deriving storage locations for the objects and stacking them accordingly.

Traditional systems use offline packing simulators to predetermine packing sequences/arrangements. The traditional packing simulators process object information (e.g., case shapes/sizes) for a predetermined or estimated set of cases to generate packing plans. Once determined, the packing plans dictate and/or require specific placement locations/poses of the objects at destinations (e.g., pallets, bins, cages, boxes, etc.), predefined sequences for the placement, and/or predetermined motion plans. From the predetermined packing plans, the traditional packing simulators may derive source requirements (e.g., sequences and/or placements for the objects) that match or enable the packing plans.

Because the packing plans are developed offline in traditional systems, the plans are independent of actual packing operations/conditions, object arrivals, and/or other system implementations. Accordingly, the overall operation/implementation will require the received packages (e.g., at the starting/pickup location) to follow fixed sequences that match the predetermined packing plans. As such, traditional systems cannot adapt to real-time conditions and/or deviations in the received packages (e.g., different sequence, location, and/or orientation), unanticipated errors (e.g., collisions, lost pieces, and/or disparate packaging conditions), real-time packing requirements (e.g., received orders), and/or other real-time factors. Furthermore, because traditional systems group and pack objects according to rigid predetermined plans/sequences, they require all objects at a source location to either (1) have a same anticipated dimension/type and/or (2) arrive according to a known sequence. For example, the traditional systems would require the objects to arrive (via, e.g., conveyor) at a pickup location according to a fixed sequence. Also, for example, the traditional systems would require the objects at the pickup location to be placed at designated locations according to a predetermined pose. As such, traditional systems require one or more operations to order and/or place the objects at the source (i.e., before the packing operation) according to the predetermined sequence/arrangement. Often times, the traditional systems require a sequence buffer, which costs upwards of one million U.S. dollars, to order and/or place the objects at the source according to the predetermined sequence/pose.

In contrast to the traditional systems, the robotic system described herein can (i) identify real-time conditions and/or deviations in received packages and/or other unanticipated errors and (ii) dynamically (e.g., as one or more objects arrive or are identified and/or after initially starting one or more operations, such as a packing operation) derive placement locations of the objects during system operation. In some embodiments, the robotic system can initiate/implement the dynamic derivation of the placement based on a triggering event, such as identification of one or more packaging/manipulation errors (e.g., a collision event or a lost piece event), an unrecognized object (e.g., at the source and/or at the destination), a change in locations/orientations of already-placed packages, and/or occurrence of other dynamic conditions. In dynamically deriving the placement locations, the robotic system can utilize various real-time conditions (e.g., currently existing or ongoing conditions) that include, e.g., available/arriving objects, object characteristics and/or requirements, placement requirements, and/or other real-time factors.

The robotic system can derive the placement locations based on a discretization mechanism (e.g., a process, a circuit, a function, and/or a routine). For example, the robotic system can use the discretization mechanism to describe physical sizes/shapes of objects and/or target locations according to a discretization unit (i.e., one discrete area/space). The robotic system can generate discretized object profiles that use the discretization units to describe the expected objects and/or discretized destination profiles that describe the target location (e.g., surface on top of the pallet and/or a space/bottom surface inside a bin/case/box). Accordingly, the robotic system can transform continuous real-world space/area into computer-readable digital information. Further, the discretized data can allow a reduction in computational complexity for describing package footprint and for comparing various package placements. For example, package dimensions can correspond to integer numbers of discretization units, which lead to easier mathematical computations, instead of real-world decimal numbers.

In some embodiments, the robotic system can check discretized cells for the placement platform to determine object placement possibilities. For example, the robotic system can use depth measurements or heights of placed objects on the placement platform. The robotic system can determine the depth measure to determine heights at/according to the discretized cells. The robotic system can evaluate the depth measure according to groupings of the discretized cells that correspond to the object targeted for placement. The robotic system can determine the maximum height within the grouping for evaluating the placement possibilities. In other words, the robotic system can determine whether the tested placement location provides sufficient support such that the placed object can be placed relatively flat (e.g., according to predetermined thresholds and/or conditions). Details regarding the dynamic placement derivations are described below.

Accordingly, the robotic system can improve efficiency, speed, and accuracy for dynamically deriving the object placement based on the real-time conditions. For example, the system described herein can derive the placement locations when the real-world conditions present uncertainties associated with and/or deviations from anticipated conditions. Further, the robotic system can reduce overall costs by eliminating the one or more operations, machines (e.g., sequence buffers), and/or human assistance that would be necessary in traditional systems to order or place the objects at the source and/or for the packing operation (e.g., for error handling). By dynamically deriving placement locations as the objects become available (e.g., based on object arrival and/or triggering events), the robotic system eliminates the need to reorganize or sequence the packages, along with the associated machines/human operations.

After deriving the object placement, the robotic system can place the object at the derived placement location in accordance with a derived approach plan. In some embodiments, the robotic system can verify that the placement of the object at the derived placement location is accurate and/or can dynamically derive placement locations for one or more other objects (e.g., based on previous placements of objects at the corresponding placement locations).

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a dynamic packing mechanism may operate. The robotic system 100 can include and/or communicate with one or more units (e.g., robots) configured to execute one or more tasks. Aspects of the dynamic packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. In some embodiments, the task can include placing the objects on a target location (e.g., on top of a pallet and/or inside a bin/cage/box/case). As described in detail below, the robotic system 100 can derive individual placement locations/orientations, calculate corresponding motion plans, or a combination thereof for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start/source location 114 to a task/destination location 116 (e.g., based on information gathered by one or more sensors, such as one or more three-dimensional (3D) vision cameras 122). For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 2:
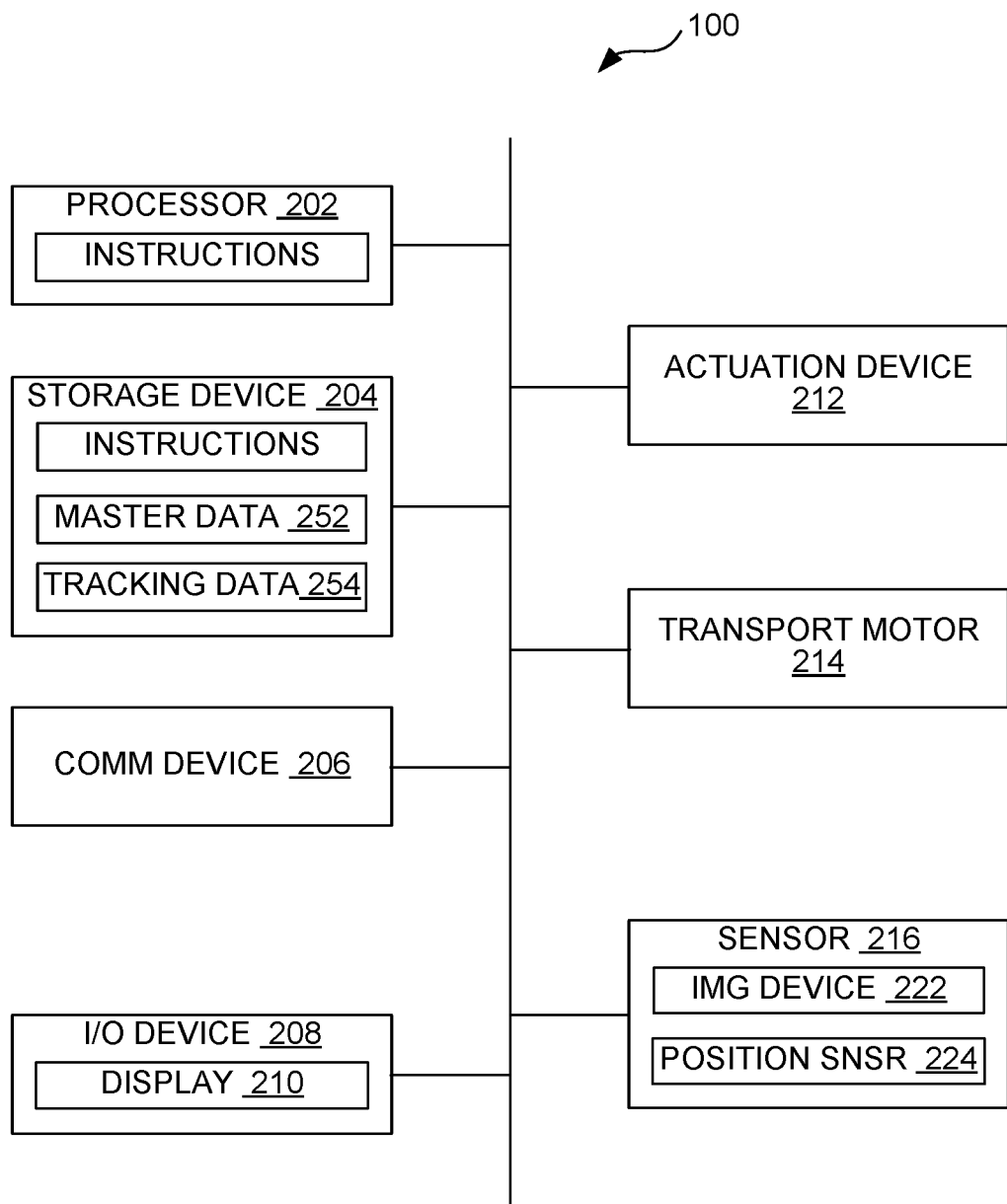
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (Wi-Fi)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g., software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location on each of the objects, expected sensor measurements (e.g., for force, torque, pressure, and/or contact measurements) corresponding to one or more actions/maneuvers, or a combination thereof. Also, for example, the storage devices 204 can store object tracking data 254. In some embodiments, the object tracking data 254 can include a log of scanned or manipulated objects. In some embodiments, the object tracking data 254 can include imaging data (e.g., a picture, point cloud, live video feed, etc.) of the objects at one or more locations (e.g., designated pickup or drop locations and/or conveyor belts). In some embodiments, the object tracking data 254 can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, two-dimensional (2D) and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze image data of a designated area (e.g., a pickup location, such as inside the truck or on the conveyor belt) to identify the target object 112 and the start location 114 thereof. Similarly, the robotic system 100 can capture and analyze image data of another designated area (e.g., a drop location for placing objects on the conveyor, a location for placing objects inside the container, or a location on the pallet for stacking purposes) to identify the task location 116. For example, the imaging devices 222 can include one or more cameras configured to generate image data of the pickup area and/or one or more cameras configured to generate image data of the task area (e.g., drop area). Based on the image data, as described below, the robotic system 100 can determine the start location 114, the task location 116, the associated poses, a packing/placement location, and/or other processing results. Details regarding the dynamic packing algorithm are described below.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Discretization Models

Figure 3B:
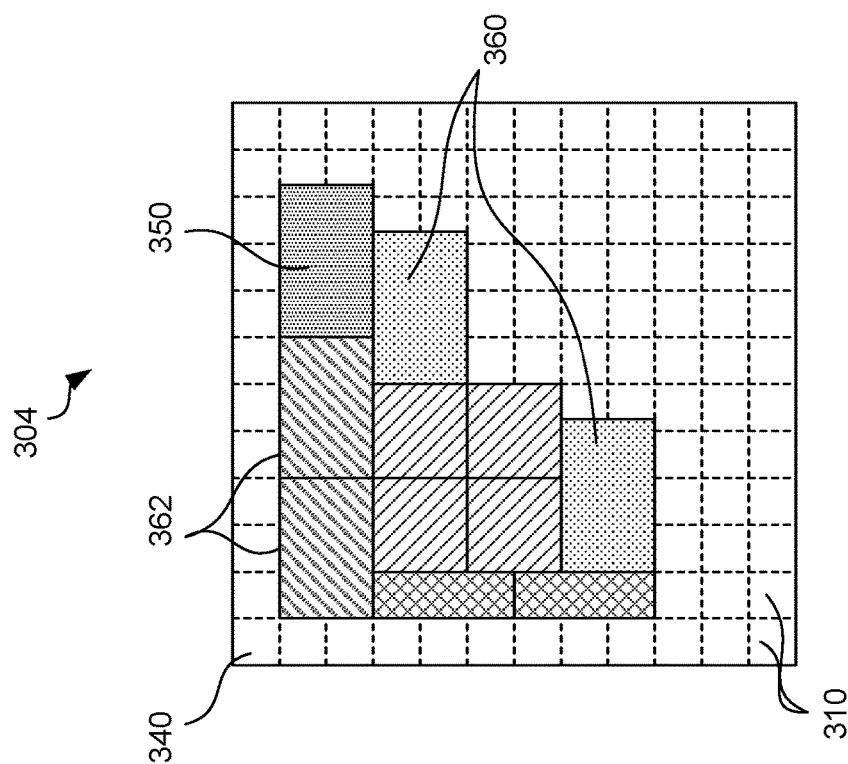
FIG. 3B is an illustration of discretized packing platform in accordance with one or more embodiments of the present technology.
Figure 3A:
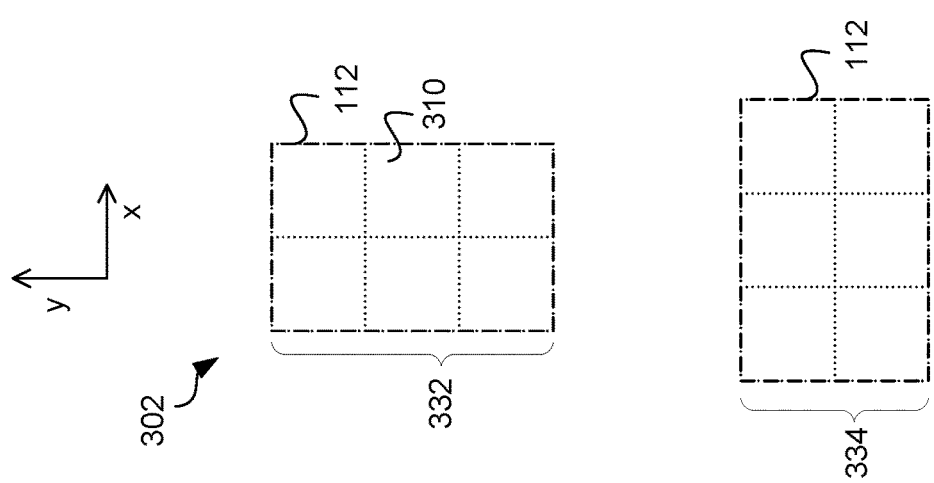
FIG. 3A is an illustration of discretized objects in accordance with one or more embodiments of the present technology.

FIG. 3A and FIG. 3B are illustrations of discretized data used to plan and pack objects in accordance with one or more embodiments of the present technology. FIG. 3A illustrates discretized objects and FIG. 3B illustrates discretized packing platform for the object packing.

In some embodiments, the robotic system 100 of FIG. 1 can include predetermined discretized models/representations of the expected objects stored in the master data 252 of FIG. 2. In some embodiments, the robotic system 100 (via, e.g., the processors 202 of FIG. 2) can dynamically generate the discretized models by mapping continuous surfaces/edges of real-world objects (e.g., packages, pallets, and/or other objects associated with the task) into discrete counterparts (e.g., unit lengths and/or unit areas). For example, the robotic system 100 can discretize image data (e.g., a top view image and/or point cloud data) of the target object 112 and/or a pallet top surface captured by the one or more imaging devices 222 of FIG. 2. In other words, the robotic system 100 can discretize the image data of the start location 114 of FIG. 1, a location before the start location 114 on a conveyor, and/or the task location 116 of FIG. 1. The robotic system 100 can discretize based on identifying an outer perimeter of the object/pallet in the image data and then dividing the area within the outer perimeter according to a unit dimension/area. In some embodiments, the unit dimension/area can be scaled or mapped for the image data based on a size and/or a location of the object/pallet relative to the imaging devices 222 according to a coordinate scheme and/or a predetermined adjustment factor/equation.

As illustrated in FIG. 3A, some embodiments of the robotic system 100 can use discretized object models 302 to plan/derive placement locations of objects (e.g., the target object 112). The discretized object models 302 (shown using dotted lines) can represent exterior physical dimensions, shapes, edges, surfaces, or a combination thereof (shown using dash lines) for arriving or incoming objects (e.g., packages, boxes, cases, etc.) according to a discretization unit (e.g., a unit length). The discretized object models 302 can represent expected/known objects and/or unexpected/unknown objects that have been imaged and discretized as described above.

As illustrated in FIG. 3B, some embodiments of the robotic system 100 can use one or more discretized platform models 304 (e.g., discretized representations of the task locations 116 of FIG. 1) to plan/derive stacking placements of objects. The discretized platform models 304 can represent a placement area 340 (e.g., the physical dimension, shape, or a combination thereof of the task location 116, such as a top surface of the task location 116, a top surface of a package placed thereon, or a combination thereof) according to the discretization unit. In one or more embodiments, the discretized platform models 304 can represent real-time conditions of the placement area 340, such as via real-time updates. For example, with respect to a top view, the discretized platform models 304 can initially represent a top surface of a pallet, an inside-bottom surface of a bin or a box, etc. that is to receive and directly contact the objects. As the robotic system 100 places the objects, the placement area 340 can change to include top surfaces of the placed packages (e.g., for stacking packages) and the discretized platform model 304 can be updated to reflect the changes.

In some embodiments, the discretized platform models 304 can be based on top views of one or more standard size pallets (e.g., 1.1 m by 1.1 m pallets). Accordingly, the discretized platform models 304 can correspond to pixelated 2D representations of the placement areas along horizontal planes (e.g., the x-y planes) according to a grid system utilized by the robotic system 100. In some embodiments, the discretized object models 302 can include top views (e.g., x-y planes) of expected or arriving objects. Accordingly, the discretized object models 302 can correspond to pixelated 2D representations of the objects.

The discretization unit, used to generate discretized models, can include a length that is set by a system operator, a system designer, a predetermined input/setting, an order, or a combination thereof. In some embodiments, the robotic system 100 can use unit pixels 310 (e.g., polygons, such as squares, having one or more dimensions according to the discretization unit) to describe areas/surfaces of targeted objects (via, e.g., the discretized object models 302) and loading platforms/surfaces (via, e.g., the discretized platform models 304). Accordingly, the robotic system 100 can pixelate the objects and the loading platforms in 2D along the x-y axes. In some embodiments, the size of the unit pixels 310 (e.g., the discretization unit) can change according to dimensions of the objects and/or dimensions of the loading platforms. The size of the unit pixels 310 can also be adjusted (via, e.g., a preset rule/equation and/or operator selection) to balance required resources (e.g., computation times, required memory, etc.) with packing accuracy. For example, when the size of the unit pixels 310 decreases, the computation times and the packing accuracy can increase. Accordingly, discretization of the packing tasks (e.g., the target packages and the packing platforms) using the unit pixels 310 that are adjustable provides increased flexibility for palletizing the packages. The robotic system 100 can control a balance between the computation resources/time with the packing accuracy according to real-time demands, scenarios, patterns, and/or environments.

In some embodiments, the robotic system 100 can include for the discretized object models 302 instances of the unit pixels 310 that only partially overlap the object, such that the unit pixels 310 extend beyond the actual peripheral edges of the object. In other embodiments, the robotic system 100 can exclude partially overlapping instances of the unit pixels 310 from the discretized platform models 304 beyond the actual dimensions of the platform surface such that the unit pixels 310 in the discretized object models 302 are overlapped and/or contained within the actual peripheral edges of the platform surface.

As an illustrative example, FIG. 3A shows a first model-orientation 332 and a second model-orientation 334 of a discretized object model representing the target object 112. In some embodiments, the robotic system 100 can rotate one of the discretized models (i.e., that is captured/stored as the first model-orientation 332) by a predetermined amount along the imaged plane. As illustrated in FIG. 3A, the robotic system 100 can rotate the discretized object model 302 about a vertical axis (extending in-out or perpendicular to the plane of the illustration) and along a horizontal plane (e.g., represented along the x and y axes) by 90 degrees for the second model-orientation 334. The robotic system 100 can use the different orientations to test/evaluate corresponding placements of the objects.

Based on the discretized data/representations, the robotic system 100 can dynamically derive a placement location 350 for the target object 112. As illustrated in FIG. 3B, the robotic system 100 can dynamically derive the placement location 350, even after one or more objects (e.g., illustrated as objects with diagonal fills in FIG. 3B) have been placed on the placement area 340. Also, the dynamic derivation of the placement location 350 can occur after/while the target object 112 is unloaded/de-shelved, registered, scanned, imaged, or a combination thereof. For example, the robotic system 100 can dynamically derive the placement location 350 as the target object 112 is transported (via, e.g., a conveyor), after the imaging devices 222 of FIG. 2 generate the image data of the target object 112, or a combination thereof.

Dynamically deriving the placement location 350 of an object provides increased flexibility and reduced human labor for shipping/packaging environments. The robotic system 100 can use discretized real-time images/depth maps of objects and the pallet (i.e., including the already-placed objects) to test and evaluate different placement locations and/or orientation. Accordingly, the robotic system 100 can still pack objects without any human operator interventions even when the object is not recognizable (e.g., for new/unexpected objects and/or computer vision errors), when an arrival sequence/order of the objects is unknown, and/or when an unexpected event occurs (e.g., a piece-loss event and/or a collision event).

For illustrative purposes the placement location 350 is shown in FIG. 3B as being adjacent to (i.e., placed on the same horizontal layer/height as) the already-placed objects, such as directly on/contacting the pallet. However, it is understood that the placement location 350 can be on top of the already-placed objects. In other words, the robotic system 100 can derive the placement location 350 for stacking the target object 112 over and/or on top of one or more objects already on the pallet. As described in detail below, the robotic system 100 can evaluate the heights of the already-placed objects in deriving the placement location 350 to ensure that the object is sufficiently supported when stacked on top of the already-placed objects.

In some embodiments, the robotic system 100 can identify object edges 362 in deriving the placement location 350. The object edges 362 can include lines in the image data that represent edges and/or sides of the objects already placed on the pallet. In some embodiments, the object edges 362 can correspond to edges that are exposed (e.g., not directly contacting/adjacent to another object/edge), such that they define a perimeter of one or a group of objects (e.g., a layer of objects) placed on the task location 116.

As described further in detail below, the robotic system 100 can derive the placement location 350 according to a set of placement rules, conditions, parameters, requirements, etc. In some embodiments, the robotic system 100 can derive the placement location 350 based on evaluating/testing one or more candidate positions 360. The candidate positions 360 can correspond to the discretized object models 302 overlaid on top of the discretized platform models 304 at various locations and/or orientations. Accordingly, the candidate positions 360 can include potentially placing the target object 112 adjacent to one or more of the object edges 362 and/or potentially stacking target object 112 on one or more of the already-placed objects. The robotic system 100 can evaluate each of the candidate positions 360 according to various parameters/conditions, such as support measure/condition, supported weight in comparison to fragility ratings (e.g., maximum supported weight, such as for packages stacked thereon) of the supporting objects, space/packing implications, or a combination thereof. The robotic system 100 can further evaluate the candidate positions 360 using one or more placement rules, such as collision free requirement, stack stability, customer-specified rules/priorities, package separation requirements or the absence thereof, maximization of total loaded packages, or a combination thereof.

Real-Time Placement Surface Updates

Figures 4A, 4B:
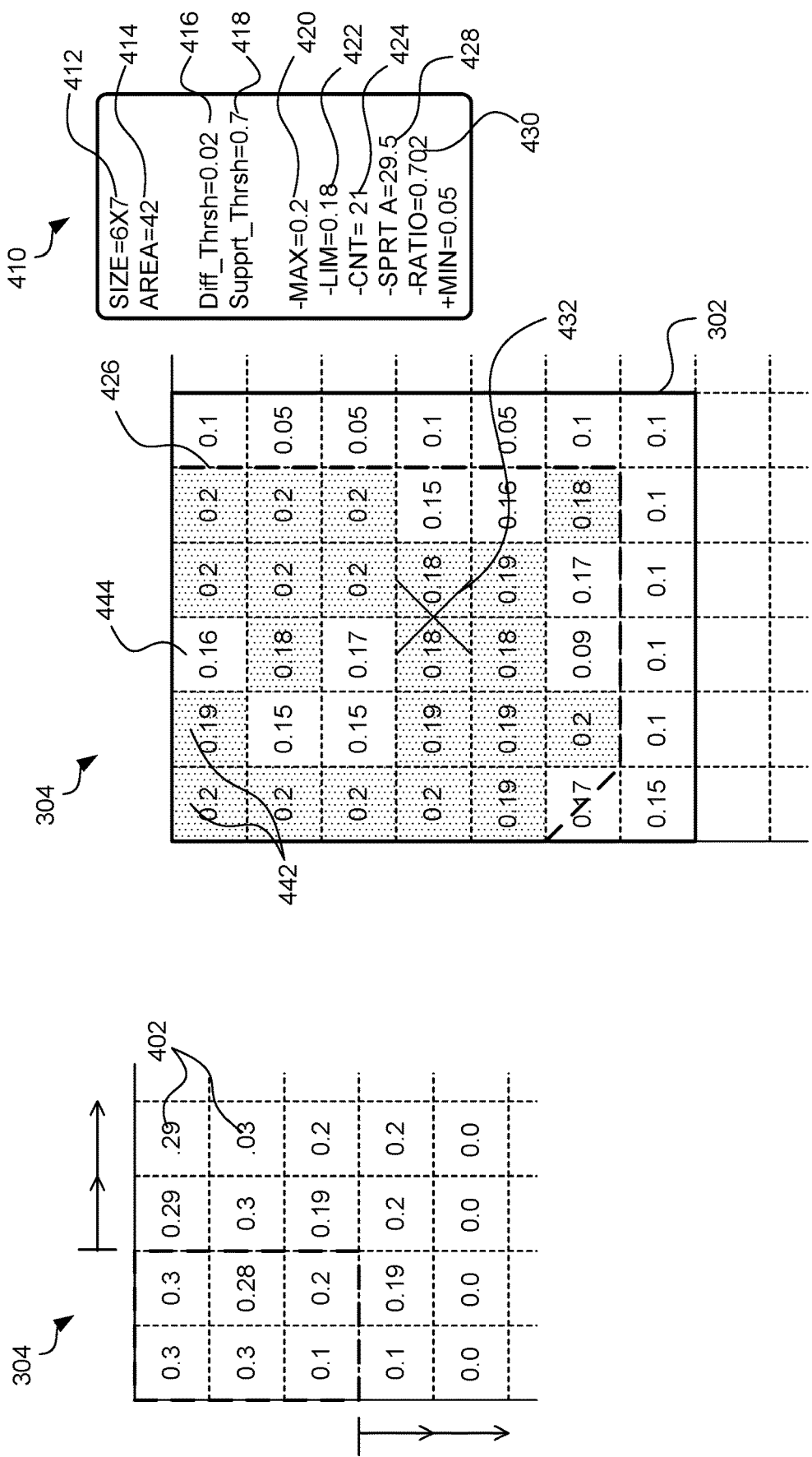
FIG. 4A is an illustration of a support computation in accordance with one or more embodiments of the present technology.
FIG. 4B is an illustration of a support metric in accordance with one or more embodiments of the present technology.

FIGS. 4A and 4B illustrate various aspects of a support computation and a support metric, in accordance with one or more embodiments of the present technology. In some embodiments, as illustrated in FIG. 4A, the robotic system 100 of FIG. 1 can generate the candidate positions 360 of FIG. 3B based on overlapping the discretized object model 302 of FIG. 3A of the target object 112 of FIG. 1 over the discretized platform model 304 of the task location 116 of FIG. 1. Further, the robotic system 100 can iteratively move the discretized object model 302 across the discretized platform model 304 in generating the candidate positions 360. For example, the robotic system 100 can generate an initial instance of the candidate position 360 by placing a corresponding discretized object model 302 according to one or more orientations (e.g., the first model-orientation 332 of FIG. 3A and/or the second model-orientation 334 of FIG. 3A) at a predetermined initial location (e.g., a corner) of the discretized platform model 304. For the next instance of the candidate position 360, the robotic system 100 can move the discretized object model 302, which corresponds to another/next object, by a predetermined distance (e.g., one or more unit pixels 310 of FIG. 3B) according to a predetermined direction/pattern.

When the candidate positions 360 overlap one or more objects already placed at the task location 116, the robotic system 100 can calculate and evaluate a measure of support provided by the already-placed objects. To calculate and evaluate the measure of support, the robotic system 100 can determine heights/contour for the placement area 340 of FIG. 3B in real-time using one or more of the imaging devices 222 of FIG. 2. In some embodiments, the robotic system 100 can use depth measures (e.g., point cloud values) from one or more of the imaging devices 222 located above the task location 116. Because a vertical position of the ground and/or of the platform (e.g., pallet) surface (e.g., a height of the platform surface above the facility ground surface) is known, the robotic system 100 can use the depth measure to calculate the heights/contour of the exposed top surface(s) of the platform, the placed objects, or a combination thereof. In some embodiments, the robotic system 100 can image the task location 116 and update the heights of the exposed top surface(s) in real-time, such as after transporting the object to and/or placing the object on the platform.

In some embodiments, as illustrated in FIG. 4A, the robotic system 100 can update the discretized platform model 304 to include height measures 402. The robotic system 100 can determine the height measures 402 according to each of the discretized pixels (e.g., the unit pixels 310) in the discretized platform model 304. For example, the robotic system 100 can determine the height measures 402 as the maximum heights for the surface portions of the placement area 340 represented by the corresponding unit pixels 310.

For each of the candidate positions 360 that overlap one or more of the already-placed objects, the robotic system 100 can evaluate the placement possibility based on the height measures 402. In some embodiments, the robotic system 100 can evaluate the placement possibility based on identifying the highest value of the height measures 402 overlapped in each of the candidate positions 360. The robotic system 100 can further identify other height measures 402 located in each of the candidate positions 360 with the height measures 402 within a limit of a difference threshold relative to the highest measure of the height measures 402. The qualifying cells/pixels can represent locations that can provide support for the stacked object such that the stacked object rests essentially flat/horizontal.

As illustrated in FIG. 4A, for the first of the candidate positions 360 (upper-left corner of the discretized platform model 304), the highest height measure can be 0.3 (i.e., 300 millimeters (mm) tall). For the difference threshold predetermined as 0.02 (representing, e.g., 20 mm), the robotic system 100 can identify the top four discretized cells/pixels as satisfying the difference threshold. The robotic system 100 can use the identified/qualifying cells/pixels to evaluate/represent the degree of support.

FIG. 4B illustrates a further example of the support computation. FIG. 4B shows one of the candidate positions 360 of FIG. 3 with the discretized object model 302 (shown using solid thicker outline) overlaid in an upper-left corner of the discretized platform model 304. The robotic system 100 can calculate/utilize various support parameters 410, which are parameters used to evaluate the candidate position 360. For example, the support parameters 410 can include discretized dimensions 412, an overlapped area 414, a height difference threshold 416, a support threshold 418, a maximum height 420, a lower height limit 422, a qualifying count 424, a set of support area outlines 426, a support area size 428, a support ratio 430, a center-of-mass (CoM) location 432, or a combination thereof.

The discretized dimensions 412 can describe physical dimensions (e.g., length, width, height, circumference, etc.) of the target object 112 of FIG. 1 according to the unit pixels 310 of FIG. 3A. For example, the discretized dimensions 412 can include quantities of the unit pixels 310 that form peripheral edges of the discretized object model 302. The overlapped area 414 can describe an area (e.g., a footprint size along the horizontal plane) occupied by the target object 112, which can similarly be represented according to the unit pixels 310. In other words, the overlapped area 414 can correspond to a quantity of the unit pixels 310 within the discretized object model 302. For the example illustrated in FIG. 4B, the target object 112 can have the discretized dimension 412 of six pixels by seven pixels, which corresponds to the overlapped area 414 of 42 pixels.

The height difference threshold 416 and the support threshold 418 can correspond to limits used to process and/or validate the candidate positions 360. The height difference threshold 416, which can be predetermined and/or adjusted by an operator and/or an order, can represent allowed deviations from another reference height (e.g., the maximum height 420 corresponding to the highest instance of the height measures 402 in the area overlapped by the discretized object model 302) for contacting and/or supporting packages placed on top. In other words, the height difference threshold 416 can be used to define a range of surface heights that can contact and/or support the package placed thereon. As such, relative to the maximum height 420, the lower height limit 422 can correspond to a lower limit for heights within the overlapped area 414 that can provide support for the stacked package. For the example illustrated in FIG. 4B, the height difference threshold 416 can be 0.02. When the maximum height 420 is 0.2, the lower height limit 422 can be 0.18. Accordingly, in placing the target object 112 at the candidate position 360, the robotic system 100 can estimate that surfaces/pixels with heights greater than 0.18 will contact and/or provide support for the target object 112.

Accordingly, in one or more embodiments, the robotic system 100 can categorize the unit pixels 310 within the overlapped area 414 according to the height difference threshold 416. For example, the robotic system 100 can categorize the unit pixels 310 having heights satisfying the height difference threshold 416 (i.e., values greater than or equal to the lower height limit 422) as supporting locations 442 (e.g., a grouping of unit pixels 310 that represent a surface capable of having objects stacked thereon, such as represented in FIG. 4B via shaded pixels). The robotic system 100 can categorize the other unit pixels 310 as unqualified locations 444 (e.g., pixels with heights lower than the lower height limit 422).

The support threshold 418 can represent a limit for evaluating the candidate positions 360 based on a sufficiency of the supporting locations 442. For example, the support threshold 418 can be for evaluating an amount, a ratio, an area, a location, or a combination thereof associated with the supporting locations 442. In some embodiments, the support threshold 418 can be used to determine whether the qualifying count 424 (e.g., an amount of the supporting locations 442) for the candidate position 360 is sufficient for supporting the target object 112.

In one or more embodiments, the support threshold 418 can be used to evaluate a supported area (e.g., the unit pixels 310 that can provide support to an object stacked thereon, as can be determined by the height threshold) associated with the supporting locations 442. For example, the robotic system 100 can determine the support area outlines 426 based on extending edges and/or determining lines that extend across or around the unqualified locations 444 to connect corners of outermost/perimeter instances of the supporting locations 442. Thus, the support area outlines 426 can exclude the unqualified locations 444. Accordingly, the support area outlines 426 can define a perimeter for the supported area based on the perimeter instances of the supporting locations 442. Since the support area outlines 426 can extend across and/or include the unqualified locations 444, the support area size 428 (e.g., a quantity of the unit pixels 310 within the supported area) can be greater than the qualifying count 424. As such, the support area size 428 effectively represents separations between the outermost edges/corners where the support is provided. Because wider supports are preferred (e.g., wherein portions of the support area outlines 426 are greater than the overlap are 414 of the object for reducing overhangs and/or improving stability), the support threshold 418 can correspond to a minimum number of the unit pixels 310 in the supported area (e.g., for evaluating the support area outlines 426), thereby effectively evaluating a separation between the outermost edges/corners where the support is provided.

In some embodiments, the support threshold 418 can be for evaluating the support ratio 430, which can be calculated based on comparing the qualifying count 424 and/or the support area size 428 to the overlapped area 414. For example, the support ratio 430 can include a ratio between the qualifying count 424 and the overlapped area 414 for representing horizontal stability, supported weight concentration, or a combination thereof. Also, the support ratio 430 can include a ratio between the support area size 428 and the overlapped area 414 for representing relative widths between supporting edges/corners under the target object 112.

Further, the robotic system 100 can further evaluate the candidate positions 360 based on the CoM location 432 of the target object 112. In some embodiments, the robotic system 100 can access the CoM location 432 of the target object 112 from the master data 252 of FIG. 2 and/or dynamically estimate the CoM location 432 based on gripping and/or lifting the target object 112. Once accessed/estimated, the robotic system 100 can compare the CoM location 432 to the support area outlines 426. The robotic system 100 can require the candidate position 360 to include the CoM location 432 within the support area outlines 426 and eliminate/disqualify the candidate positions 360 that fail to satisfy such requirement. In one or more embodiments, the robotic system 100 can calculate and evaluate a placement score based on separation distances (e.g., along the x and/or the y axes) between the CoM location 432 and the support area outlines 426.

The robotic system 100 can use the support parameters 410 to evaluate constraints/requirements. For example, the robotic system 100 can eliminate/disqualify the candidate positions that do not satisfy the support threshold 418, a CoM location threshold (e.g., a requirement to include the CoM location 432 within the support area outlines 426), and/or other stacking rules. Also, the robotic system 100 can use the support parameters 410 to calculate the placement scores for the candidate positions 360 (e.g., the locations that satisfy the constraints) according to predetermined weights and/or equations. As described in detail below, the robotic system 100 can use the calculated placement score to rank the candidate positions 360 according to the predetermined preferences (e.g., as reflected by the weights/equations).

Object Placement Operation

Figure 5:
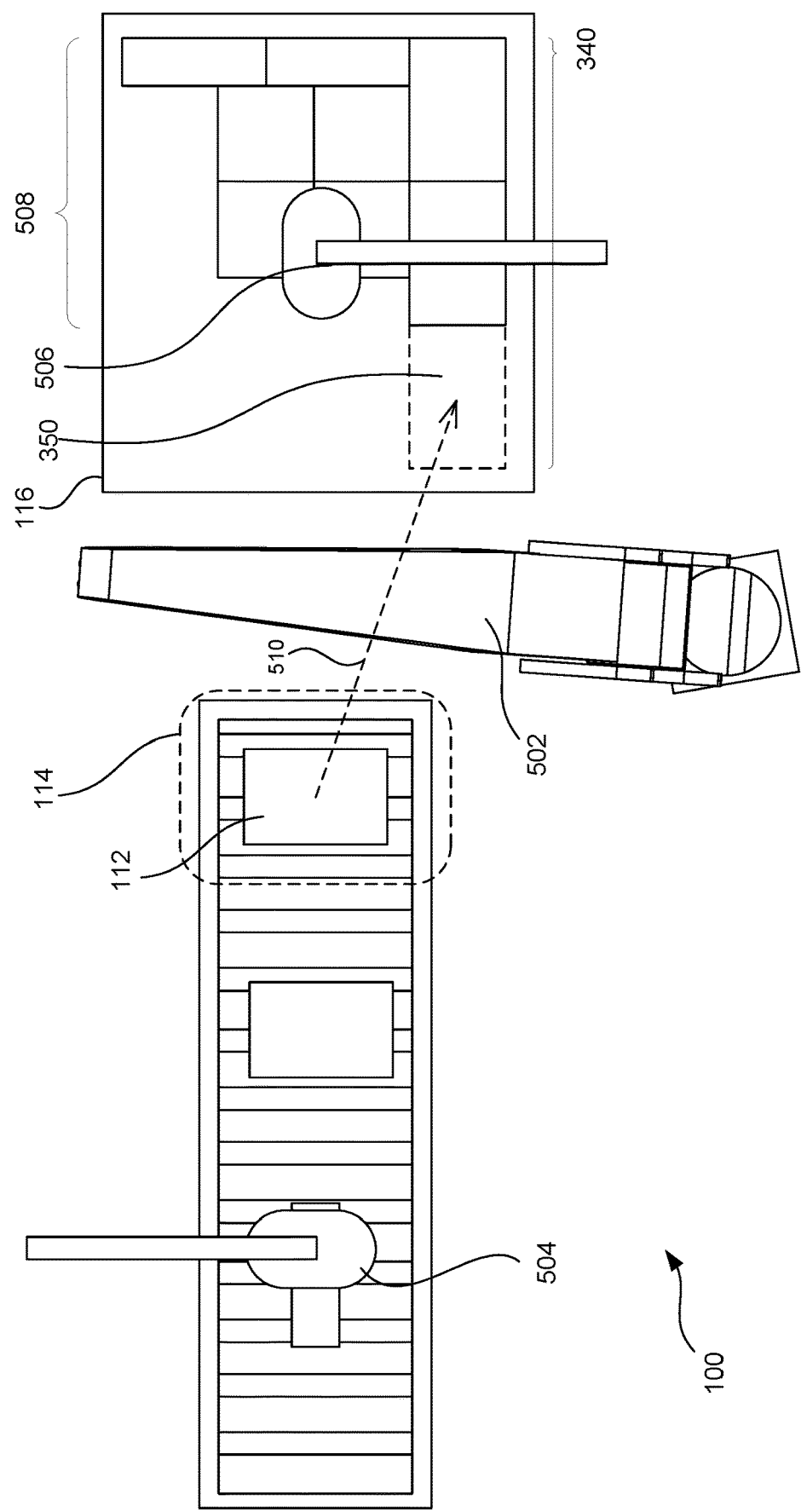
FIG. 5 is a top view illustrating an example placement executed by the robotic system in accordance with one or more embodiments of the present disclosure.
Figure 6:
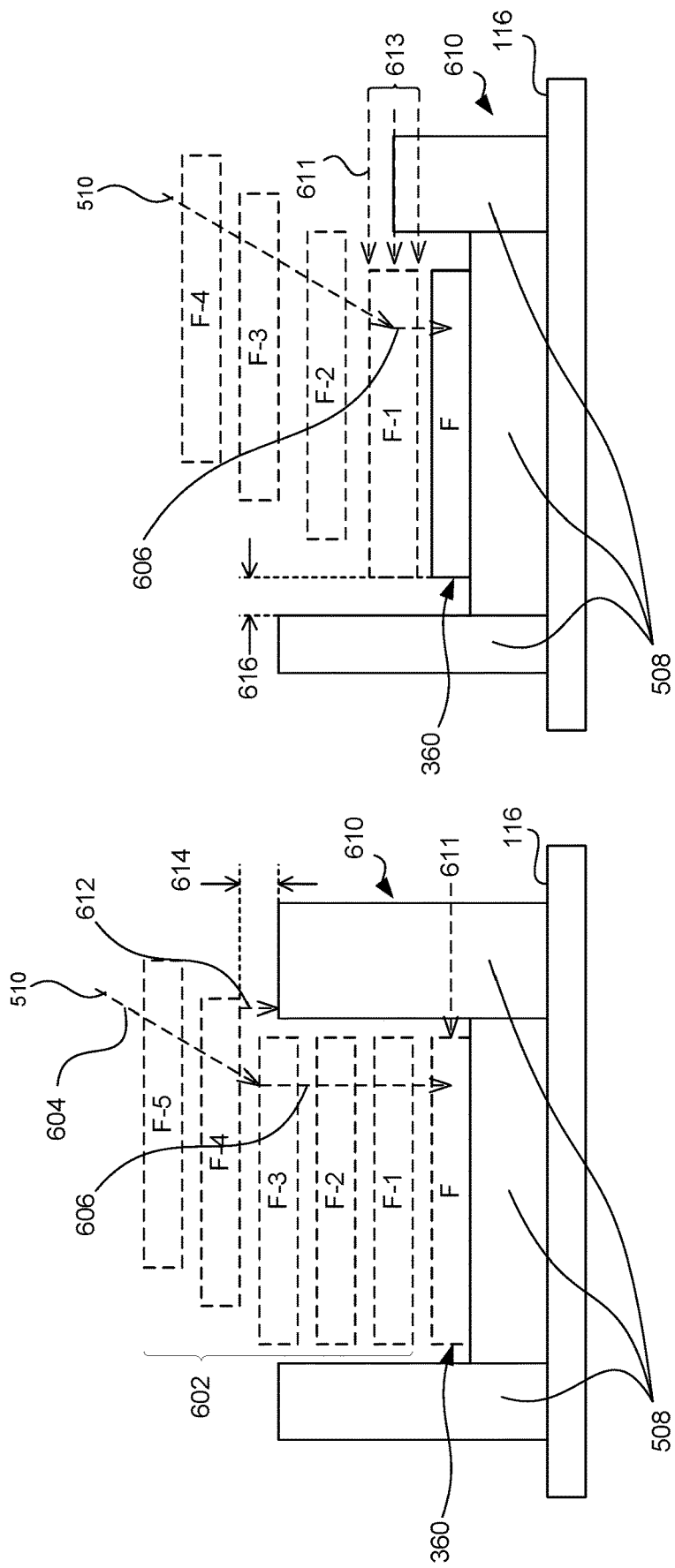
FIG. 6A is a profile view illustrating a first example approach in accordance with one or more embodiments of the present disclosure.
FIG. 6B is a profile view illustrating a second example approach in accordance with one or more embodiments of the present disclosure.

FIG. 5 is a top view illustrating an example placement executed by the robotic system 100 in accordance with one or more embodiments of the present disclosure. In some embodiments, the robotic system 100 can include and/or communicate with a robotic arm 502 (e.g., a portion of the transfer unit 104 of FIG. 1, such as a palletizing robot) configured to transfer the target object 112 from the start location 114 and place it at the derived placement location 350 at the task location 116. For example, the robotic system 100 can operate the robotic arm 502 to grip and pick up the target object 112 from a designated location/portion on a conveyor and place the target object 112 on a pallet.

The robotic system 100 can dynamically derive the placement location 350 (e.g., as the target object 112 arrives at the facility and/or at the start location 114 and/or after initially starting one or more operations, such as the packing operation). The robotic system 100 can dynamically derive the placement location 350 based on, or to account for, one or more errors or uncertainty factors, such as an absence of a packing plan (e.g., a plan for representing placement locations 350 derived for a set of objects, including the target object 112, at the task location 116), an error in arriving objects (e.g., when the object doesn't match an expected/known object or sequence), or a combination thereof. The robotic system 100 can also dynamically derive the placement location 350 based on or to account for one or more uncertainties or errors at the destination, such as due to an unexpected and/or changed placement area 340 (e.g., when access to the task location 116 is partially obscured, such as when a cage or car track is not fully opened), previously placed objects 508 (e.g., unrecognizable and/or unexpected packages on the pallet and/or a shift in one or more of the previously placed objects 508), and/or collisions events (e.g., between the robotic arm 502 and a previously placed object 508).

In some embodiments, the robotic system 100 can dynamically derive the placement location 350 based on data (e.g., image data and/or measurement data) dynamically gathered via one or more of the sensors 216 of FIG. 2 (e.g., the imaging devices 222 of FIG. 2). For example, the robotic system 100 can include and/or communicate with a source sensor 504 (e.g., one of the 3D cameras 122 of FIG. 1) located over the start location 114 and/or an incoming path (e.g., conveyor). The robotic system 100 can use the data from the source sensor 504 to generate and/or access the discretized object models 302 of FIG. 3A. In one or more embodiments, the robotic system 100 can image the objects and/or measure one or more dimensions of the objects using the source sensor 504. The robotic system 100 can compare the images and/or the measurements to the master data 252 of FIG. 2 to identify the incoming objects. Based on the identification, the robotic system 100 can access the discretized object models 302 associated with the objects. In one or more embodiments, the robotic system 100 can dynamically generate the discretized object models 302 based on dividing the images/dimensions according to the unit pixel 310 as described above.

Also, the robotic system 100 can include and/or communicate with a destination sensor 506 (e.g., one of the 3D cameras 122 of FIG. 1) located over the task location 116. The robotic system 100 can use the data from the destination sensor 506 to determine and dynamically update the discretized platform models 304 of FIG. 3B. In one or more embodiments, the robotic system 100 can image and/or measure one or more dimensions of the placement area 340 (e.g., the task location 116, such as a pallet, cage, and/or car track). The robotic system 100 can use the image and/or measurements to identify, access, and/or generate the discretized platform models 304, similarly as described above for the discretized object models 302. Further, the robotic system 100 can use the data (e.g., the depth map) from the destination sensor 506 to determine the height measures 402 of FIG. 4A. Accordingly, the robotic system 100 can use the height measures 402 to update the placement area 340 and the discretized platform models 304 in real time. For example, the robotic system 100 can update the height measures 402 according to the previously placed objects 508, such as after placing the target object 112 at the placement location 350.

The robotic system 100 can derive an approach path 510 for transferring the target object 112 to the placement location 350 and/or each of the candidate positions 360 of FIG. 3B. The approach path 510 can correspond to a motion plan for manipulating/transferring the target object 112 across space from the start location 114 to the corresponding candidate position 360. The approach path 510 can be in 3D extending across horizontal and/or vertical directions.

When placing the target object 112, the robotic system 100 can verify that placing the target object 112 at the derived placement location is stable for placement of the target object 112 according to the metrics described in FIGS. 3-6 above (e.g., in the event that the state of conditions at the task location 116 has changed). After placing the object, the robotic system 100 can verify and validate whether placement of the object at the derived placement location was accurate and/or whether the state of conditions at the task location 116 has changed). Based at least in part on the information regarding validation, the robotic system 100 can continue to package one or more other objects (e.g., additional/subsequent instances of the target object 112) at the task location 116 (e.g., by dynamically deriving the placement locations for the one or more other objects).

Approach Path Evaluation

FIGS. 6A and 6B are profile views illustrating example approaches for placing the target object 112 of FIG. 1 in accordance with one or more embodiments of the present disclosure. FIGS. 6A and 6B illustrate the approach paths 510 of FIG. 5 for placing the target object 112 at the corresponding candidate position 360 of FIG. 3B over one or more of the previously placed objects 508 on the task location 116 (e.g., a pallet).

The robotic system 100 of FIG. 1 can derive the approach paths 510 based on approach increments 602, which are illustrated as the dashed boxes of F-1 to F-5. The approach increments 602 can include sequential positions of the target object 112 in 3D space along the corresponding approach path 510. In other words, the approach increments 602 can correspond to sampled positions of the target object 112 for following the corresponding approach path 510. The approach increments 602 can be aligned according to path segments 604 of the corresponding approach path 510. The path segments 604 can correspond to linear segments/directions in the approach path 510. The path segments 604 can include a final segment 606 for placing the target object 112 at the corresponding candidate position 360. The final segment 606 can include a vertical (e.g., a downward) direction.

To derive the approach paths 510, the robotic system 100 can identify any of the previously placed objects 508 that may potentially become an obstacle 610 (e.g., such as a potential obstacle when placing the target object 112 at the candidate position 360). In one or more embodiments, the robotic system 100 can identify potential obstacle(s) 610 as instance(s) of the previously placed objects 508 overlapping a horizontal line 611 (e.g., a straight line along the x-y plane) connecting the start location 114 and the corresponding candidate position 360. The robotic system 100 can further identify the potential obstacle(s) 610 as instance(s) of the previously placed objects 508 overlapping a lane 613 derived around the horizontal line 611, such as based on deriving the lane parallel to and overlapping the horizontal line and having a width based on one or more dimensions (e.g., a width, a length, and/or a height) of the target object 112. As illustrated in FIGS. 6A and 6B, the start location 114 can be to the right of the candidate position 360. Accordingly, the robotic system 100 can identify the previously placed object on the right as the potential obstacle 610.

In some embodiments, the robotic system 100 can validate the potential obstacle 610 based on the height measures 402 of FIG. 4A. For example, the robotic system 100 can validate/identify the potential obstacles 610 with one or more of the height measures 402 greater than or equal to those of the candidate position 360 as the potential obstacles 610. The robotic system 100 can eliminate the previously placed objects 508 having the height measures 402 less than those of the candidate position 360. In one or more embodiments, the robotic system 100 can identify/eliminate the potential obstacles 610 based on an ambiguity associated with the height of the candidate position 360 and/or the height of the potential obstacles 610.

In some embodiments, the robotic system 100 can derive the approach paths 510 in a reverse order, such as beginning from the candidate position 360 and ending at the start location 114 of FIG. 5. Accordingly, the robotic system 100 can derive the final segment 606 first (e.g., before other segments) to avoid the potential obstacles 610. For example, the robotic system 100 can determine the approach increments 602 (e.g., 'F-1' first, then 'F-2', etc.) based on iteratively increasing the height of the approach increments 602 by a predetermined distance. For each iteration, the robotic system 100 can calculate and analyze a vector 612 between the determined approach increment 602 (e.g., a bottom surface/edge thereof) and the potential obstacles 610 (e.g., a top surface/edge thereof). The robotic system 100 can continue to increase the height of the approach increments 602 until the vector 612 indicates that the determined approach increment 602 is above the potential obstacles 610 and/or clears the potential obstacles 610 by a clearance threshold 614 (e.g., a requirement for a minimum vertical separation for the target object 112 above a highest point of the potential obstacles 610 to avoid contact or collision between the target object 112 and the potential obstacle 610). When the determined approach increment satisfies the clearance threshold 614 or for the following iteration, the robotic system 100 can adjust the corresponding approach increment 602 along a horizontal direction (e.g., toward the start location 114) by a predetermined distance. Accordingly, the robotic system 100 can derive the final segment 606 and/or the subsequent path segments 604 based on the candidate position 360 and the approach increment 602 that satisfied the clearance threshold 614 to derive the approach paths 510.

Once derived, the robotic system 100 can use the approach paths 510 to evaluate the corresponding candidate positions 360. In some embodiments, the robotic system 100 can calculate the placement score according to the approach paths 510. For example, the robotic system 100 can calculate the placement score according to a preference (e.g., according to one or more weights that correspond to predetermined placement preferences) for a shorter length/distance for the final/vertical segment 606. Accordingly, in comparing the approach paths 510 of FIGS. 6A and 6B, the robotic system 100 can prefer the path illustrated in FIG. 6B, which has a shorter length of the final/vertical segment 606. In one or more embodiments, the robotic system 100 can include a constraint, such as a maximum limit, associated with the approach paths 510 (e.g., for the final/vertical segment 606) used to eliminate or disqualify candidate positions 360.

In some embodiments, the robotic system 100 can further evaluate the corresponding candidate positions 360 according to other collision/obstruction related parameters. For example, the robotic system 100 can evaluate the candidate positions 360 according to horizontal separations 616 between the candidate positions 360 and one or more of the previously placed objects 508. Each of the horizontal separations 616 can be a distance (e.g., a shortest distance) along a horizontal direction (e.g., x-y plane) between the corresponding candidate position 360 and an adjacent instance of the previously placed objects 508. The robotic system 100 can calculate the placement scores for the candidate positions 360 based on the horizontal separation 616 similarly as described above for the approach paths 510. Also, the robotic system 100 can eliminate or disqualify candidate positions 360 based on the horizontal separation 616, such as when the horizontal separation 616 fails a minimum requirement. Details regarding the placement score calculation and/or the constraints for eliminating the candidate positions 360 are discussed below.

Operational Flow

Figure 7:
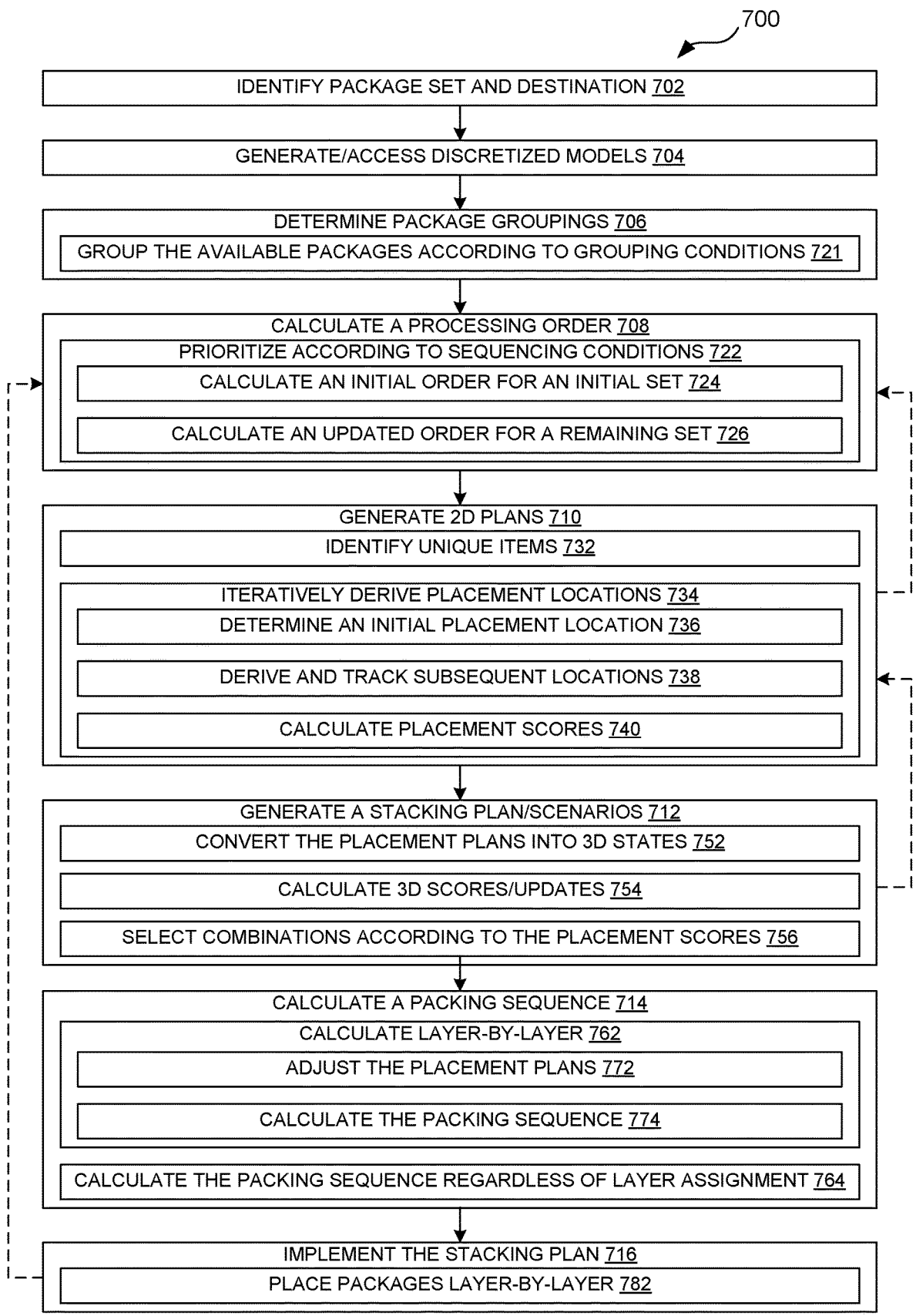
FIG. 7 is a flow diagram for operating the robotic system of FIG. 1 in accordance with one or more embodiments of the present technology.

FIG. 7 is a flow diagram for a method 700 of operating the robotic system 100 of FIG. 1 in accordance with one or more embodiments of the present technology. The method 700 can be for generating 2D/3D packing plans for placing packages (e.g., cases and/or boxes) onto a platform (e.g., a pallet) and/or for placing the packages accordingly. The method 700 can be implemented based on executing the instructions stored on one or more of the storage devices 204 of FIG. 2 with one or more of the processors 202 of FIG. 2.

At block 702, the robotic system 100 can identify a package set (e.g., available packages) and a destination (e.g., the task location 116 of FIG. 1, such as a pallet and/or a container for receiving the packages). For example, the robotic system 100 can identify the package set to represent the available packages including packages that are available for packing, located at a source, designated for placement, and/or listed in an order/request/manifest. Also, the robotic system 100 identify a size or a dimension of an area (e.g., a top loading surface of the pallet, such as the placement pallet 340 of FIG. 3) of the task location 116 where the packages can be placed. In some embodiments, the robotic system 100 can identify a size, a dimension, a type, or a combination thereof for a pallet.

At block 704, the robotic system 100 can generate and/or access discretized models (e.g., the discretized object models 302 of FIG. 3A and/or the discretized platform models 304 of FIG. 3B) corresponding to the package set that represents the available packages and/or the task location 116. In some embodiments, the robotic system 100 can generate (e.g., in real-time, such as after receiving the order and/or prior to beginning the packing operation, or offline) the discretized models based on dividing physical dimensions of the objects and/or the platform area (e.g., the pallet top surface according to the unit pixel 310 of FIG. 3B). The unit pixel 310 can be predetermined (by, e.g., a manufacturer, an ordering customer, and/or an operator), such as at 1 millimeters (mm) or 1/16 inches (in) or greater (e.g., at 5 mm or 20 mm).

In some embodiments, the robotic system 100 can access the discretized models stored in the storage devices 204 and/or another device (e.g., a storage device, a database, and/or a server of a package supplier accessed via the communication devices 206 of FIG. 2). The robotic system 100 can access the predetermined discretized models that represents the available packages and/or the task location 116. For example, the robotic system 100 can access the discretized object models 302 corresponding to the available packages by searching the master data 252 of FIG. 2 (e.g., a predetermined table or a lookup table) for the available packages and their corresponding models. Similarly, the robotic system 100 can access the discretized platform model 304 representing the platform, such as the identified pallet, where the available packages are to be placed.

At block 706, the robotic system 100 can determine package groupings (e.g., subgroupings of the available packages). The robotic system 100 can determine the package groupings based on the available packages for placing them on the identified platform (e.g., the placement pallet 340). The robotic system 100 can determine the package groupings according to similarities and/or patterns in one or more characteristics of the available packages. In some embodiments, as illustrated at block 721, the robotic system 100 can determine the package grouping by grouping the available packages according to grouping conditions/requirements. Some examples of the grouping conditions/requirements can include a package priority (e.g., as specified by one or more customers), a fragility rating (e.g., a maximum weight supportable by the package), a weight, a package dimension (e.g., a package height), a package type, or a combination thereof. In grouping the available packages, the robotic system 100 can search the master data 252 for the various characteristics of the available packages that match the grouping conditions/requirements.

At block 708, the robotic system 100 can calculate a processing order (e.g., a sequence for considering/deriving placement locations) for the available packages and/or the groupings thereof (i.e., the package groupings). In some embodiments, as illustrated at block 722, the robotic system 100 can calculate the processing order according to one or more sequencing conditions/requirements. For example, the robotic system 100 can prioritize placement planning of the package groupings according to a number of packages within each of the groupings, such as for processing the package groupings with a greater number of packages earlier in the placement planning. As another example, the robotic system 100 can prioritize placement planning of packet groupings according to filling rate of each group, such as for processing the package groupings with a fewer number of larger packages earlier in the placement planning than a package grouping with a greater number of smaller packages. In some embodiments, the sequencing conditions can overlap with the grouping conditions, such as for the weight ranges, the fragility ratings, etc. For example, the robotic system 100 can prioritize the processing of the heavier and/or the less fragile packages for earlier processing and/or for placement in lower layers.

In some embodiments, the robotic system 100 can prioritize the placement planning according to a combined horizontal area. The robotic system 100 can calculate (via, e.g., multiplying corresponding widths and lengths) or access surface areas of top surfaces of the packages in the groupings using information specified in the master data 252. In calculating the combined horizontal area, the robotic system 100 can add the surface areas of packages having the same type and/or heights within a threshold range. In some embodiments, the robotic system 100 can prioritize the placement planning of groupings that have the larger combined horizontal area for earlier processing and/or for placement in lower layers.

For one or more embodiments, the robotic system 100 can load a buffer with identifiers and/or quantities of the available packages. The robotic system 100 can sequence the identifiers in the buffer according to the groupings. Further, the robotic system 100 can sequence the identifiers in the buffer according to the processing order. Accordingly, the sequenced values in the buffer can correspond to the available packages and/or remaining packages.

As illustrated at block 724, for example, the robotic system 100 can calculate the processing order for an initial set (e.g., the package set) of the available packages before implementing a corresponding stacking plan, such as before any of the packages in the package set is placed on the platform. In some embodiments, as illustrated at block 726, the robotic system 100 can calculate the processing order for a remaining set of the available packages after initiating or while implementing the corresponding stacking plan. For example, as illustrated by a feedback loop from block 716, the robotic system 100 can calculate the processing order for the remaining set (e.g., a portion of the available packages that have not been transferred to the platform and/or remain at a source location) according to one or more triggering conditions. Example triggering conditions can include stacking errors (e.g., lost or fallen packages), collision events, predetermined retriggering timings, or a combination thereof.

At block 710, the robotic system 100 can generate 2D plans for placing the available packages along a horizontal plane. For example, the robotic system 100 can generate the placement plans to represent the 2D mappings of the available packages along the horizontal plane. The robotic system 100 can generate two or more placement plans based on the discretized models. For example, the robotic system 100 can generate the placement plans based on comparing the discretized object models 302 to the discretized platform model 304. The robotic system 100 can determine different placements/arrangements of the discretized object models 302, overlap/compare them to the discretized platform model 304, and validate/retain the arrangements that are within the boundaries of the discretized platform model 304 when overlapped. The robotic system 100 can designate the packages that cannot be placed within the boundaries of the discretized platform model 304 for another layer (e.g., another instance of the placement plans). Accordingly, the robotic system 100 can iteratively derive placement locations for the placement plans that represent 2D layers of the stacking plan until each of the packages in the package set have been assigned a location in the placement plans.

In some embodiments, the robotic system 100 can generate the placement plans based on the package groupings. For example, the robotic system 100 can determine the arrangements for the packages within one package grouping before considering placements of packages in another grouping. When packages within a package grouping overflows a layer (i.e., the packages cannot fit in one layer or one instance of the discretized platform model 304) and/or after placing all packages of one grouping, the robotic system 100 can assign locations for the packages in the next grouping to any remaining/unoccupied areas in the discretized platform model 304. The robotic system 100 can iteratively repeat the assignments until none of the unassigned packages can fit over remaining spaces of the discretized platform model 304.

Similarly, the robotic system 100 can generate the placement plans based on the processing order (e.g., based on the package groupings according to the processing order). For example, the robotic system 100 can determine a test arrangement based on assigning packages and/or groupings according to the processing order. The robotic system 100 can assign the earliest sequenced package/grouping an initial placement for the test arrangement, and then test/assign the subsequent packages/groupings according to the processing order. In some embodiments, the robotic system 100 can retain the processing order for the packages/groupings across layers (e.g., across instances of the placement plans). In some embodiments, the robotic system 100 can recalculate and update (illustrated using a dashed feedback line in FIG. 7) the processing order after each layer is filled.

In some embodiments, as an illustrative example of the above described processes, the robotic system 100 can generate the 2D plans by identifying the different package types within the package set. In other words, at block 732, the robotic system 100 can identify unique packages (e.g., as represented by the package types) within each of the package grouping and/or the package set.

At block 734, the robotic system 100 can derive (e.g., iteratively) placement locations for each of the available packages. At block 736, the robotic system 100 can determine an initial placement location for the unique package first in sequence according to the processing order. The robotic system 100 can determine the initial placement location according to a predetermined pattern as described above. In some embodiments, the robotic system 100 can calculate initial placements for each unique package. The resulting initial placements can each be developed into a unique placement combination (e.g., an instance of a search tree), such as by tracking the placement plan 350 across iterations. At block 738, the robotic system 100 can derive and track candidate placement locations for the subsequent packages according to the processing order and/or the remaining packages as described above. Accordingly, the robotic system 100 can iteratively derive the placement combinations.

In deriving the placement combinations (e.g., candidate placement locations), the robotic system 100 can test/evaluate locations of the discretized object model 302 of the corresponding package based on iteratively deriving and evaluating candidate stacking scenarios (e.g., potential combinations of unique placement locations for the available packages). The candidate stacking scenarios can each be derived based on identifying unique potential locations (e.g., according to a predetermined sequence/rule for placement locations) for the packages according to the above discussed sequence. The candidate stacking scenarios and/or the unique placement locations can be evaluated according to one or more placement criteria (e.g., requirements, constraints, placement costs, and/or heuristic scores). For example, the placement criteria can require that the discretized object models 302 entirely fit within horizontal boundaries of the discretized platform model 304 when placed at the selected location. Also, the placement criteria can require that placement of the discretized object models 302 be within or over a threshold distance relative to the initial placement location (e.g. such as along a horizontal direction) and/or the previous placement location, such as for adjacent placements or separation requirements. Other examples of the placement criteria can include preferences for adjacently placing packages having smallest difference(s) in one or more package dimensions (e.g., height), the fragility ratings, the package weight ranges, or a combination thereof. In some embodiments, the placement criteria can include collision probabilities that can correspond to locations and/or characteristics (e.g., height) of previously assigned packages in the layer relative to a reference location (e.g., location of the palletizing robot). Accordingly, the robotic system 100 can generate multiple unique placement combinations (i.e., candidate placement plans for each layer and/or the candidate stacking scenarios that each include multiple layers) of package placement locations. In some embodiments, the robotic system 100 can track the placements of the combination based on generating and updating a search tree across the placement iterations.

At block 740, the robotic system 100 can calculate/update a placement score for each combination/package placement. The robotic system 100 can calculate the placement score according to one or more of the placement conditions/preferences (e.g., package dimensions, collision probabilities, fragility ratings, package weight ranges, separation requirements, package quantity conditions). For example, the robotic system 100 can use preference factors (e.g., multiplier weights) and/or equations to describe a preference for: separation distances between packages, differences in package dimensions/fragility ratings/package weights for adjacent packages, the collision probabilities, continuous/adjacent surfaces at the same height, a statistical result thereof (e.g., average, maximum, minimum, standard deviation, etc.), or a combination thereof. Each combination can be scored according to the preference factors and/or the equations that may be predefined by a system manufacturer, an order, and/or a system operator. In some embodiments, the robotic system 100 can calculate the placement score at the end of the overall placement iterations.

In some embodiments, the robotic system 100 can update the sequence of the placement combinations in a priority queue after each placement iteration. The robotic system 100 can update the sequence based on the placement score.

The robotic system 100 can stop the placement iterations, such as when one candidate placement plan is finished, based on determining an empty source status, a full layer status, or an unchanged score status. The empty source status can represent that all of the available packages have been placed. The full layer status can represent that no other package can be placed in the remaining areas of the considered discretized platform model 304. The unchanged score status can represent that the placement score for the combination remains constant across one or more consecutive placement iterations. In some embodiments, the robotic system 100 can repeat the placement iterations using different initial placement locations and/or different processing order (e.g., for reordering groups having same sequencing value/score associated with the sequencing conditions) to derive other instances of the candidate stacking scenarios. In other words, the robotic system 100 can generate multiple 2D placement plans, where each 2D placement plan can represent a layer within a 3D stack (e.g., an instance of the candidate stacking scenarios). In other embodiments, the robotic system 100 can iteratively consider the 3D effect as a 2D placement plan is derived and begin deriving the next layer as a next iteration when the 2D placement plan becomes full.

At block 712, the robotic system 100 can generate a stacking plan. In some embodiments, the robotic system 100 can begin generating the stacking plan when the placement location of the processed package overlaps one or more previously placed/processed packages.

In generating the stacking plan and/or assessing the 2D plans, the robotic system 100 can convert each of the placement combinations and/or the placement plans into 3D states as illustrated at block 752. For example, the robotic system 100 can assign the height values for the packages to the placement combinations. In other words, the robotic system 100 can generate a contour map (an estimate of a depth map) based on adding the package heights to placement combinations.

With the 3D states, the robotic system 100 can evaluate the placement combinations according to one or more stacking rules (e.g., a horizontal offset rule, a support separation rule, and/or a vertical offset rule). As an illustrative example, when the placed package is stacked on/over one or more previously processed packages, the robotic system 100 can eliminate any of the placement combinations that violate an overlap requirement, an overhang requirement, the vertical offset rule, a CoM offset requirement, or a combination thereof. In one or more embodiments, the robotic system 100 can eliminate any of the placement combinations that violate fragility ratings of one or more packages under the processed package, such as by estimating the supported weights at the overlapped packages and comparing them to the corresponding fragility ratings.

For the remaining placement combinations, the robotic system 100 can calculate 3D placement scores or update the placement score, such as illustrated at block 754. The robotic system 100 can use predetermined preferences (e.g., weights and/or equations) associated with placement costs and/or heuristic values for 3D placements. The predetermined 3D preferences can be similar to the 2D preferences, grouping preferences, sequencing conditions, or a combination thereof. For example, the 3D preferences can be configured to calculate collision probabilities based on the 3D state and to calculate scores that favor the placement combinations with lower collision probabilities. Also, the robotic system 100 can calculate the scores based on the remaining packages, sizes of support areas with common height, number of packed items in the 3D state, difference between the heights of the processed packages, or a combination thereof. In some embodiments, the robotic system 100 can update the sequence of the placement combinations in the priority queue according to the scores.

After the 3D states have been processed, the robotic system 100 can update the 2D plans by deriving a placement for the next package in the remaining packages, such as at block 710. The robotic system 100 can repeat the above-described process until a stopping condition, such as when all of the available packages have been processed (i.e., empty value/set for the remaining packages) and/or when the placement combinations cannot be improved (also referred to as unimproved combinations). Some examples of unimproved combinations can include when the currently processed placement eliminates the last of the placement combinations in the priority queue due to one or more of the violations and/or when the placement score remains constant for the preferred combinations across a threshold number of iterations.

When the stopping condition is detected, such as at block 756, the robotic system 100 can select one of the derived placement combinations according to the placement scores (e.g., the 2D and/or the 3D related scores). Accordingly, the robotic system 100 can designate the selected placement combination as the stacking plan (e.g., a set of the placement plans).

In some embodiments, as an illustrative example, the robotic system 100 can implement the functions of block 710 and 712 differently. For example, at block 710, the robotic system 100 can generate the 2D plan (e.g., an instance of the placement plan 350) for a bottom layer as described above. In doing so, the robotic system 100 can be configured to place heavier preference (e.g., greater parameter weights) for matching package heights, heavier package weights and/or greater supportable weight for the packages in considering the placements and/or the processing order. The robotic system 100 can derive the first 2D plan for the base layer as described above for block 710.

Once the first 2D layer is complete/full as described above, thereby forming the base layer, the robotic system 100 can convert the placement plan into 3D states as described for block 712/752. Using the 3D information, the robotic system 100 can identify one or more planar sections/areas (e.g., the placement surfaces 352-356 of FIG. 3B) of the base layer as described above. Using the planar sections, the robotic system 100 can iteratively/recursively derive package placements for the next layer above the base layer. The robotic system 100 can consider each of the planar sections as new instances of the discretized platform models 304 and test/evaluate different placements as described above for block 710. In some embodiments, the robotic system 100 can derive the 2D placements using the placement surfaces but calculate the score across the entirety of the placement pallet 340. Accordingly, the robotic system 100 can be configured to follow preferences for larger placement areas for subsequent layers without being limited to the preceding placement areas.

Once the iterative placement process stops for the second layer, the robotic system 100 can calculate planar sections (e.g., top surfaces having heights within a threshold range) for the derived layer to generate the 2D placements of the remaining packages/groupings for the next above layer. The iterative layering process can continue until the stopping condition has been met as described above.

In some embodiments, the robotic system 100 can separately generate 2D plans (e.g., two or more of the placement plans) at block 712. The robotic system 100 can generate the stacking plan based on vertically combining (e.g., arranging/overlapping the 2D placement plans along a vertical direction) the 2D plans.

At block 714, the robotic system 100 can calculate a packing sequence (e.g., the stacking sequence 530 of FIG. 5B) based on the stacking plan. As an example, the packing sequence can be for identification of the placing order of the available packages. In some embodiments, as illustrated at block 762, the robotic system 100 can calculate the packing sequence layer-by-layer. In other words, the robotic system 100 can calculate the packing sequence for each layer and then connect the sequences according to the order/position of the layers from bottom to top. In calculating the packing sequence, in some embodiments, the robotic system 100 can adjust the placement plans as illustrated at block 772. For example, the robotic system 100 can adjust the placement plans by reassigning one or more of the packages (e.g., packages with heights that increase the collision probabilities for subsequent manipulations/transfers) from a lower-layer placement plan to a higher-layer placement plan. Any packages supported by the reassigned package can also be reassigned to a further higher layer. In other words, the reassigned packages can remain at the same horizontal placement and be associated with a higher layer, such that the packages can be placed later as illustrated in FIG. 5B. At block 774, the robotic system 100 can calculate the packing sequence (e.g., the stacking sequence 530) based on the adjusted placement plan, such as by packing/manipulating objects that are assigned in the higher layers after the objects assigned in the lower layers.

In other embodiments, as illustrated at block 764, the robotic system 100 can calculate the packing sequence regardless/independent of the layer assignments. In other words, the robotic system 100 can calculate the packing sequence such that packages assigned to a lower layer may be placed after packages assigned to a higher layer.

In calculating the packing sequence, both within or across layers, the robotic system 100 can analyze the locations of the packages in the stacking plan according to one or more package dimensions (e.g., heights), relative placement locations, or a combination thereof. For example, the robotic system 100 can sequence placements of boxes further away from a unit/reference location (e.g., location of the palletizing robot) before closer assigned packages. Also, the robotic system 100 can place the taller/heavier packages earlier when their assigned locations are along the perimeters of the placement plan and away from the unit location.

At block 716, the robotic system 100 can implement the stacking plan for placing the available packages on the platform. The robotic system 100 can implement the stacking plan based on communicating one or more motion plans, actuator commands/settings, or a combination thereof to the corresponding device/unit (e.g., the transfer unit 104 of FIG. 1, the actuation devices 212 of FIG. 2, the sensors 216 of FIG. 2, etc.) according to the stacking plan. The robotic system 100 can further implement the stacking plan based on executing the communicated information at the devices/units to transfer the available packages from a source location to the destination platform. Accordingly, the robotic system 100 can place the available packages according to the 3D mapping, where one or more of the available packages are placed/stacked on top of other packages, such as placing the available packages layer-by-layer. Further, the robotic system 100 can manipulate/transfer the packages according to the packing sequence. As such, the robotic system 100 can place the packages layer-by-layer or without such restrictions as described above.

Figure 8:
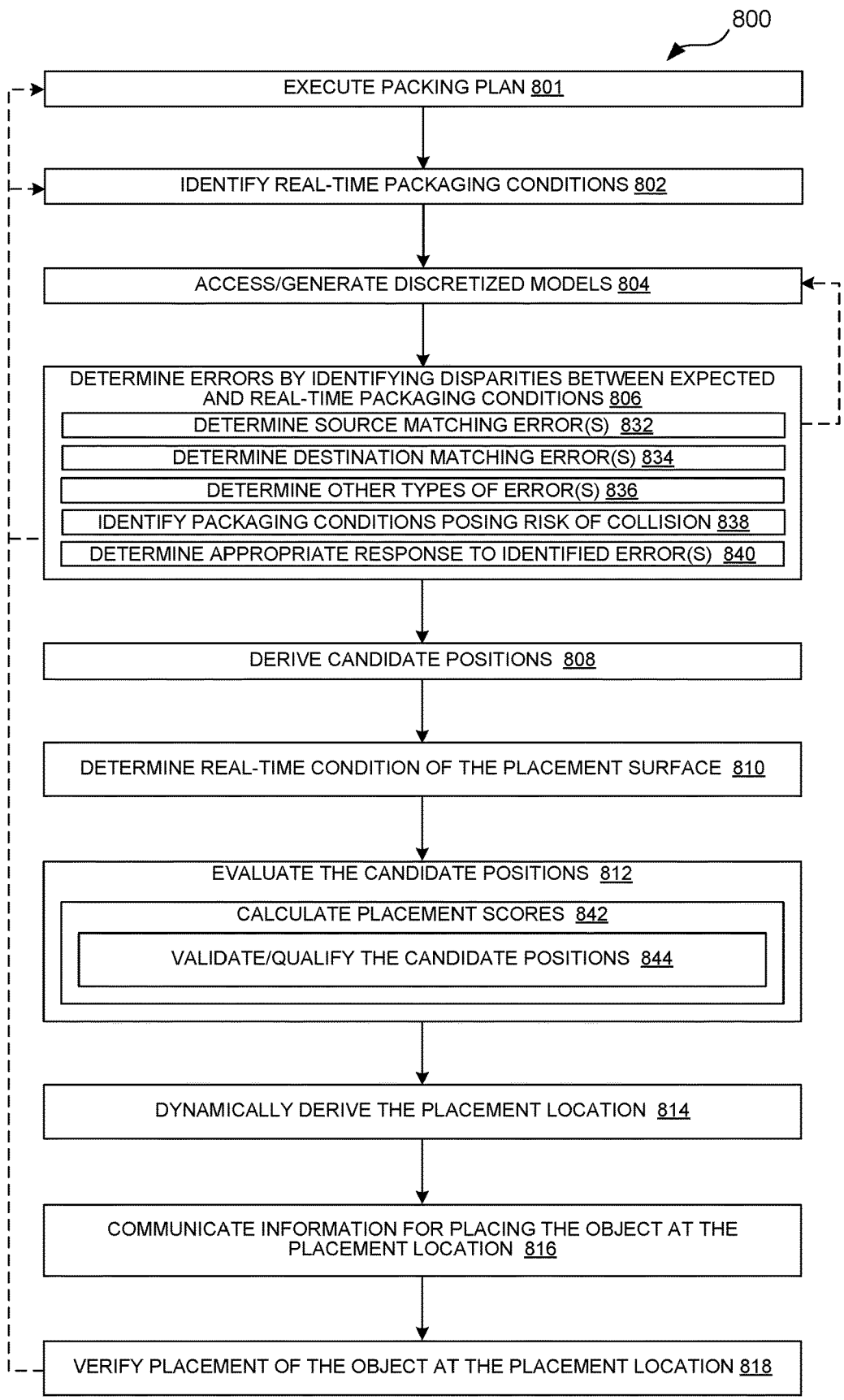
FIG. 8 is a flow diagram for operating the robotic system of FIG. 1 in accordance with one or more embodiments of the present technology.

FIG. 8 is a flow diagram for a method 800 of operating the robotic system 100 of FIG. 1 in accordance with one or more embodiments of the present technology. The method 800 can be used to detect errors and potential collisions and determine appropriate responses. For example, the method 800 can be used to dynamically derive the placement locations 350 of FIG. 3B for target objects 112 of FIG. 3 at a task location 116 of FIG. 1 and/or adjust an existing packing plan (e.g., details regarding specific placement locations/poses of a set of objects at destinations, associated sequences and/or motion plans, or a combination thereof) due to the detected errors. As described in greater detail below, possible errors include deviations or disparities between expected packaging conditions and real-time packaging conditions. In other words, the errors can correspond to unexpected events (e.g., collisions, dropped/lost objects, shifts in already-placed objects, and/or occlusion at the task location 116) that may occur while placing the objects at the task location 116 according to the packing plan. In these and other embodiments, expected packaging conditions can be based on, at least in part, a change in packaging conditions (according to, e.g., the packing plan) before, during, or after placing a target object and/or a previously placed object 508. In these and still other embodiments, the method 800 can be implemented by executing instructions stored on one or more storage devices 204 of FIG. 2 with one or more processors 202 of FIG. 2.

As discussed above, the method 700 of FIG. 7 can be implemented to derive and/or implement the packing plans, and as described in greater detail in U.S. patent application Ser. No. 16/428,645, filed May 31, 2019, and titled "A ROBOTIC SYSTEM WITH PACKING MECHANISM," which is incorporated herein by reference in its entirety.

After the 3D stacking plan and/or the packing sequence has been generated, the robotic system 100 can begin executing the packing plan as illustrated at block 801. To execute the packing plan, the robotic system 100 can operate (via, e.g., generating, sending, implementing corresponding commands, settings, motion plans, etc. to/at) one or more of the robotic units, such as the unloading unit 102, the transfer unit 104, the transport unit 106, the loading unit 108, etc. illustrated in FIG. 1. The robotic system 100 can operate the robotic units to transport the objects to the start location 114 of FIG. 1 and manipulate (via, e.g., the transfer unit 104) the objects from the start location 114 to place them at/on the task location 116 of FIG. 1 (e.g., a pallet, cage, car track, etc.) according to the 3D stacking plan. For example, the robotic system 100 can transport (via, e.g., the transport unit 106, such as the conveyor) the objects to the start location 114 according to the packing sequence and place the objects at locations on the placement area 340 of FIG. 3B according to the 3D packing plan. The robotic system 100 can further track a progress while executing the packing plan to identify the objects in the packing sequence and/or the 3D packing plan that have been placed at the assigned locations.

At block 802, the robotic system 100 can identify real-time packaging conditions. While implementing the packing plan, the robotic system 100 can identify real-time packaging conditions at or about (e.g., within a predetermined distance from) the start location 114 and/or the task location 116. For example, the robotic system 100 can receive and analyze information (e.g., sensor data from the sensors 216 of FIG. 2) regarding each of the incoming objects and/or objects at the task location 116 in real time. In some embodiments, the robotic system 100 can receive (e.g., from the source sensor 504 of FIG. 5) and analyze source sensor data that represents one or more objects, including the target object 112, that are at or approaching the start location 114. In these and other embodiments, the robotic system 100 can receive (e.g., from the destination sensor 506 of FIG. 5) and analyze destination sensor data representing a placement area (e.g., the placement area 340) associated with the task location 116 and/or the previously placed objects 508 of FIG. 5 thereon.

In some embodiments, the robotic system 100 can analyze the sensor data. In analyzing the sensor data, the robotic system 100 can process the sensor data (e.g., images and/or depth maps from the sensors 216) to identify/estimate edges. For example, the robotic system 100 can process the sensor data, such as using Sobel filters, to recognize edges of the target object 112, the task location 116, the previously placed objects 508, or a combination thereof. The robotic system 100 can use the edges to identify areas that represent separate objects and/or dimensions thereof. In these and other embodiments, the robotic system 100 can estimate one or more dimensions or lengths of a sensed object (e.g., of the incoming object, of the target object 112, of the pallet, of the cage, etc.) based on the sensor data (e.g., source sensor data). The robotic system 100 can further use the identifies areas to determine a pose and/or a location of the object. For example, the robotic system 100 can map the edges to an existing grid system to determine an orientation and/or a location of the object.

At block 804, the robotic system 100 can access and/or generate discretized models (e.g., the discretized object models 302 of FIG. 3A and/or the discretized platform models 304 of FIG. 3B) that represent incoming packages (including, e.g., the target object 112) and/or the task location 116, such as the pallet and/or the cage. The robotic system 100 can determine (e.g., generate and/or access) the discretized models (e.g., discretized object models 302 and/or the discretized platform models 304) based on the real-time sensor data (e.g., the source sensor data and/or the destination sensor data). In some embodiments, the robotic system 100 can identify an object type (e.g., an identification or a category for the incoming object) for the target object 112, based on the source sensor data. For example, the robotic system 100 can search the master data 252 stored in the storage devices of FIG. 2 and/or in another device (e.g., a storage device, a database, and/or a server of a package supplier accessed via the communication devices 206 of FIG. 2) using the identifying information (e.g., the surface image and/or the estimated dimensions) to find and access matching discretized models.

In some embodiments, the robotic system 100 can dynamically generate a discretized model of the target object in real-time, such as directly in response to receiving the source sensor data. To dynamically generate the discretized models, the robotic system 100 can divide the sensor data and/or corresponding physical dimensions (e.g., for the incoming object, the pallet top surface, etc.) according to the unit pixel 310 of FIG. 3B. In other words, the robotic system 100 can generate the discretized models based on overlaying the unit pixels 310 over an area representative of the target object 112 and/or the task location 116 according to the corresponding sensor data. The unit pixel 310 can be predetermined (by, e.g., a manufacturer, an ordering customer, and/or an operator), such as at 1 mm or ¹⁄₁₆ inches (in) or greater (e.g., at 5 mm or 20 mm). In some embodiments, the unit pixel 310 can be based (e.g., a percentage or a fraction) on a dimension or a size of one or more of the packages and/or the platform.

At block 806, the robotic system 100 can detect or determine whether one or more errors have occurred. For example, the robotic system 100 can determine whether errors have occurred by identifying deviations or disparities between expected packaging conditions and the real-time packaging conditions. In other words, the robotic system 100 can determine whether errors have occurred by comparing the sensor data to an expected state of the start location 114 and/or to an expected state of the task location 116. Examples of possible errors identified by the robotic system 100 include source matching errors (e.g., master data errors, unexpected object errors, arrival sequence errors, etc.), destination matching errors (e.g., placement accessibility errors, unexpected placement errors, placement area errors, etc.), and/or operational status errors (e.g., collision errors, transportation errors, shifted object errors, etc.).

At block 832, the robotic system 100 can identify source matching errors. To identify source matching errors, the robotic system 100 can compare the source sensor data to data corresponding to expected packaging conditions at the start location 114. In one embodiment, the robotic system 100 can detect a master data error by comparing the source sensor data to master data (e.g., the master data 252 of FIG. 2) that includes descriptions, such as property information, of the possible objects that are pre-registered at the robotic system 100. In these embodiments, the robotic system 100 can determine whether the properties (e.g., physical properties, such as height, width, length, weight, and/or other properties) of the target object 112 captured in the source sensor data match the property information of the objects stored in the master data 252. In the event the properties of the target object 112 captured in the source sensor data do not match the property information of the objects stored in the master data 252, the robotic system 100 can determine that a master data error has occurred. Accordingly, the robotic system 100 can identify source matching errors associated with arrival of un-registered and/or unrecognized objects.

In these and other embodiments, the robotic system 100 can detect an unexpected object error and/or an arrival sequence error by comparing the source sensor data to data corresponding to the packing plan and/or the packing sequence. To continue the example, the robotic system 100 can compare the derived properties (e.g., physical properties) of the target object 112 to expected properties of an object scheduled to arrive at the start location 114 in accordance with the packing sequence and the tracked progress. If the properties of the target object 112 matched one of the objects registered in the master data 252, the robotic system 100 can compare the identifier/type of the matched object to that of the expected object according to the tracked progress of the packing sequence. In the event the target object 112 does not match the expected object, the robotic system can determine that an unexpected object error has occurred (e.g., that the target object 112 is not the expected object and/or has arrived out of sequence). In some embodiments, the robotic system 100 can proceed to compare the target object 112 (e.g., properties thereof and/or matched identifier) to one or more other objects scheduled to (e.g., subsequently to and/or previously to the target object 112) arrive at the start location 114 in accordance with the packing sequence. For example, the robotic system 100 can compare the target object 112 to a predetermined number of objects that precede or follow the expected object within the packing sequence. In the event that the properties of the target object 112 match the expected properties of another object scheduled to arrive at the start location 114, the robotic system 100 can determine that an arrival sequence error has occurred (e.g., that the target object 112 has arrived at the start location 114 out of sequence) and/or can store the target object 112 for the next occurrence of the target object 112 to execute one or more real-time adjustments (e.g., storing the target object 112 at a temporary holding area and then accessing it according to the next expected order/timing).

Additionally, or alternatively, the robotic system 100 can identify destination matching errors at block 834. To identify destination matching errors, the robotic system 100 can compare the destination sensor data to data corresponding to expected packaging conditions at the task location 116. For example, the robotic system 100 can track the current progress of the 3D packing plan based on identifying the objects that have been placed. The robotic system 100 can use one or more computer models to determine an expected shape and/or an expected surface contour (e.g., a set of height estimates corresponding to the expected placement surface) that correspond to the tracked progress. The robotic system 100 can compare images, the depth map, and/or other data representative of the current state of the task location 116 (e.g., a discretized platform model and/or current height measures of the task location 116) captured using the sensors 216 to the expected shape and/or the expected surface contour. The robotic system 100 can determine destination matching errors based at least in part on disparities between the current state of the task location 116 and the expected state of the task location 116.

As an illustrative example, the robotic system 100 can analyze captured images and/or other data of the task location 116 (e.g., of the placement area 340 and/or previously placed objects 508 at the task location 116) to determine current properties, such as the locations/positions, poses/orientations, physical dimensions, shapes, height measurements, and/or other properties of the task location 116 and/or of the previously placed objects 508. To determine destination matching errors, the robotic system 100 can compare one or more of the current properties of the task location 116 to one or more expected properties of the task location 116, of the previously placed objects 508, and/or of the placement area 340 to identify any mismatches or disparities. Using the comparison between the current properties and the expected properties, the robotic system 100 can determine whether one or more errors (e.g., a placement accessibility error, an unexpected placement error, and/or a placement area error) have occurred. Some examples of the placement accessibility error (e.g., properties of the placement area 340 differ from what was expected) can be based on the placement area 308 having a different size or shape than anticipated, such as due to a placing of the wrong sized pallet for the task location 116 or a wall of a container (e.g., a cage or a car track) for the task location 116 not being fully opened. Some examples of the unexpected placement error can be based on one or more of the previously placed objects 508 having an unexpected location/pose due to, for example, the one or more previously placed objects 508 having moved, shifted, and/or fallen and/or having been placed at a wrong location and/or orientation. Some examples of the placement area error can correspond to height measurements of the placement area 340 being different than expected. In these and other embodiments, the robotic system 100 can use the destination sensor data to determine that one or more of the previously placed objects 508 was previously misplaced or is missing, and/or that an unexpected object is at the task location 116.

At block 836, the robotic system 100 can determine other types of errors. For example, the robotic system 100 can analyze the real-time packaging conditions (e.g., feedback data from the robotic units and/or current conditions at the object source/destination) to identify operational errors, such as collision errors (e.g., robotic units and/or objects have collided), and/or object movement errors (e.g., objects have shifted during or after placement). As another example, the robotic system 100 can identify transport or manipulation errors, such as when a gripper on the transfer unit 104 does not have a sufficient grip of an object and/or when an object is dropped/lost during transport/manipulation). The robotic system 100 can obtain various feedback data, such as locations, speeds, status (e.g., external contact status and/or grip status), force measurements (e.g., externally applied force, grip force, and/or weight/torque measured at a gripper), or a combination thereof from the robotic units while implementing the packing operation (illustrated at block 801). The robotic system 100 can compare the obtained data to one or more predetermined thresholds/templates that characterize the operational errors to identify occurrences thereof.

At block 838, the robotic system 100 can identify packaging conditions that pose a risk of collision. In some embodiments, the robotic system 100 can identify whether packaging conditions pose a risk of collision independently from or in response to determining one or more errors have occurred (at blocks 832-836). The robotic system 100 can analyze the sensor data to identify a risk of collision between robotic units and/or objects should the robotic system 100 continue to package/palletize the target object 112. If the target object 112 is the expected object according to the packing sequence, the robotic system 100 can recalculate and/or access the approach path 510 of FIG. 5 for placing the target object 112 according to the 3D packing plan. Since the current conditions have deviated from the expected conditions due to the determined error, the robotic system 100 can compare the approach path 510 and the real-time conditions to determine the risk of collision. In some embodiments, the robotic system 100 can analyze the real-time sensor data such that the robotic system 100 identifies real-time packaging conditions in accordance with a specified priority (e.g., in decreasing magnitudes of risk of collision and/or errors). Referring to the task location 116, for example, the robotic system 100 can analyze the destination sensor data such that the robotic system 100 identifies real-time packaging conditions that may impede the approach path 510 in the following order: (a) whether a container at the task location 116 in the context of a placement accessibility error pose a risk of collision (e.g., due to the container not being fully opened); (b) whether one or more previously placed objects 508 that have moved, shifted, and/or fallen in the context of an unexpected placement error pose a risk of collision; (c) whether one or more previously placed objects 508 that were placed at a wrong location and/or orientation in the context of placement area error pose a risk of collision; and/or (d) whether palletized case heights in the context of a placement area error pose a risk of collision (e.g., due to a disparity between expected and actual height measurements of the placement area 340 as described above).

If the robotic system 100 determines that no errors have occurred or fails to identify an error or a packaging condition that poses a risk of collision at blocks 832-838, the robotic system 100 can return to block 801 to continue execution of the packing plan. Otherwise, in any of the error and potential collision scenarios outlined above, continued execution of the packing plan will likely result in additional errors. For example, the stacked pallet may include the wrong items and/or it can become unstable due to it or its objects having different properties (e.g., difference heights for one or more supporting objects in the stack) than intended by the packing plan. Additionally, the risk of collisions between robotic units and/or objects can increase due to discrepancies in object locations and/or unexpected impedances.

As such, in response to determining one or more errors and/or identifying one or more packaging conditions posing a risk of collision, the robotic system 100 (at block 840) can determine a response to the errors and/or potential collisions identified at blocks 832-838. Examples of appropriate responses can include any one or more of the following: (a) alerting an operator and/or another system of the error and/or the real-time conditions posing a risk of a collision; (b) returning to block 804 to dynamically generate a discretized model of the target object 112; (c) updating the master data 252; (d) updating a master list of the task location 116 to include an unexpected object at the task location 116 and/or to exclude a missing object at the task location 116; (e) placing the target object 112 at a location other than at the task location 116 (e.g., setting the target object 112 aside and/or caching the target object 112 for later transportation/manipulation to the task location 116); (f) repositioning one or more previously placed objects 508; (g) implementing the packing plan by dynamically adjusting the approach path 510; (h) modifying or adjusting the packing plan by dynamically deriving an updated placement location; (i) creating a new packing plan; and/or (j) abandoning the packing plan and dynamically deriving placement locations as objects arrive.

In some embodiments, the robotic system 100 can determine the appropriate response based on the type of the identified error or potential collision. For example, in the context of a master data error, the robotic system 100 may be able to continue with implementation of the packing plan. As such, the appropriate response to a master data error can include placing the target object 112 (i.e., the object not matching the master data 252) at a temporary location, placing subsequent objects at their designated locations or at the temporary location (such as, e.g., when the placement blocks the approach path 510 initially intended for the target object 112). When the expected object (i.e., in comparison to the target object 112) arrives at the start location 114, the robotic system 100 can place the expected object at the initially intended location. Caching or placing the target object 112 at a temporary location is described in greater detail in U.S. patent application Ser. No. 16/428,843, filed May 31, 2019, and titled "ROBOTIC SYSTEM FOR PROCESSING PACKAGES ARRIVING OUT OF SEQUENCE," which is incorporated herein by reference in its entirety. When one or more subsequent instances of the expected object (i.e., same type/identifier as the target object 112) also cause the master data error, in some embodiments, the robotic system 100 can compare the dimensions and/or the discretized model of the target object 112 to those of the expected object. If the compared data match or are within a predetermined threshold range, the robotic system 100 can notify an operator and/or continue to implement the packing plan after updating the master data. For example, the flow can return to block 804 to dynamically generate a discretized model of the target object 112 in real-time and update the master data 252 to include the generated discretized model.

If the dimensions and/or the discretized data do not match or differ by measures exceeding the threshold range, the robotic system 100 can abandon the existing packing plan and re-derive the packing plan according to the updated master data and the current conditions (e.g., the remaining packages and/or the initial heights of the placement surface). Accordingly, the robotic system 100 can implement the method 700 or one or more portions thereof described above. In some embodiments, for example, the robotic system 100 can re-identify the package set (block 706) according to the remaining objects and implement one or more of the following operations (e.g., as illustrated at block 704 and more). In some embodiments, the robotic system 100 can access and adjust the previously determined package groupings according to the current conditions (by, e.g., removing the already-placed objects), retain the previously determined processing order, and re-derive the 2D and 3D placement plans accordingly. For example, the robotic system 100 can use the current condition at the task location 116 as an updated placement surface (e.g., instead of the discretized platform model 304) or identify the current condition as an existing portion of the plan, such as results of previous planning iterations described above. Alternatively, when the remaining number of packages are under a threshold limit, the robotic system 100 can dynamically derive the placement locations as described in detail below.

As another example, for a placement accessibility error where a container at the task location 116 is not fully opened, the robotic system 100 can alert an operator and/or another system that the cage or car track is not fully opened. Additionally, or alternatively, the robotic system 100 can determine an extent to which the packing plan is affected by the container not being fully opened. For example, the robotic system 100 can determine the extent (e.g., a number and/or relative locations of affected objects within the 3D packing plan) based on overlaying the 3D packing plan over the destination data (e.g., image and/or the depth map) and identifying and/or counting the objects in the 3D packing plan that overlap with the partially-closed wall or covering of the cage/car track. Also, the robotic system 100 can determine the extent by comparing the approach paths 510 for one or more of the objects in the 3D packing to the walls/edges of the cage car track and identify the paths that intersect with the walls/edges. The robotic system 100 can adjust the extent based on identifying (according to, e.g., predetermined functions, rules, models, etc.) and accounting for (such as by e.g., increasing the affected object count) other dependent objects that are supported by the affected objects. In these embodiments, when the locations/patterns of the affected objects match one or more predetermined templates and/or the quantity of the affected objects is below a threshold quantity, the robotic system 100 can determine that the appropriate response is to implement the packing plan by dynamically modifying or adjusting the approach path 510 such that the robotic system 100 places the target object 112 at a location at the task location 116 designated by the packing plan while avoiding colliding with the container and/or with the previously placed objects 508.

Alternatively, the robotic system 100 can determine that the container is fully or significantly closed such as when the number of affected objects exceed the threshold quantity, which corresponds to a condition that a large portion of the task location 116 is inaccessible to the robotic system 100. In some embodiments, the robotic system 100 can determine the appropriate response to the placement accessibility error is to dynamically rederive/adjust the placement locations 350 for the target object 112 and/or subsequently arriving objects (as described in greater detail below with respect to blocks 808-816) as the objects arrive at the start location 114. In some embodiments, the robotic system 100 can determine the appropriate response to the placement accessibility error is to create a new packing plan to utilize as much of the task location 116 that remains accessible to the robotic system 100. For example, the robotic system 100 can halt the packing operation (block 801) and determine package groupings for the new packing plan by grouping available packages (e.g., the target object 112, packages that have yet to arrive at the start location 114 but that are scheduled to arrive in accordance with the previous packing plan, and/or the previously placed objects 508) according to grouping conditions. The robotic system 100 can then (i) generate 2D plans by identifying unique items and iteratively deriving placement locations and (ii) generate the new packing plan by converting the 2D plans into 3D states, calculating 3D scores, and selecting placement combinations according to placement scores. In these and other embodiments, the robotic system 100 can (i) cache the target object 112 and/or one or more other packages that arrive at the start location 114 to adjust the packing sequence defined by the prior packing plan and/or (ii) reposition one or more previously placed objects 508.

In some embodiments, the robotic system 100 can determine that an appropriate response to an identified error and/or potential collision is to dynamically derive the placement locations 350 for the target object 112 and the subsequent objects. For example, the robotic system 100 can dynamically derive the placement location 350 when the identified errors and/or potential collisions meet or exceed predefined conditions or thresholds. As a specific example, the robotic system 100 can dynamically derive the placement locations in response to an unexpected placement error (e.g., where one or more previously placed objects 508 have moved, shifted, etc.) as described above.

To dynamically derive a placement location 350 for the target object 112, the robotic system 100 can derive a set of candidate positions (e.g., the candidate position 360 of FIG. 3B) for placing the target object 112 at/over the task location 116 at block 808. The robotic system 100 can derive the candidate positions 360 based on overlapping the discretized object model 302 of the target object 112 over the discretized platform model 304 of the current state of the task location 116 at corresponding locations in/over the task location 116. The candidate positions 360 can correspond to locations of the discretized object models 302 along a horizontal plane and over/within the discretized platform model 304. The robotic system 100 can derive the candidate positions 360 overlapping and/or adjacent to the previously placed objects 508.

In some embodiments, the robotic system 100 can iteratively determine the locations of the discretized object model 302 based on determining an initial placement location (e.g., a predetermined location for an instance of the candidate position 360, such as a designated corner of the placement area). The robotic system 100 can determine subsequent candidate positions 360 according to a predetermined direction for deriving the next candidate positions 360, a separation requirement between the candidate positions 360 across iterations, a rule/condition governing the placement, a limit on the total number of the candidate positions 360, one or more patterns thereof, or a combination thereof. Further, the robotic system 100 can include a set of preferences and/or rules for determining the candidate positions 360 relative to the previously placed objects 508. For example, the robotic system 100 can be configured with preferences toward (e.g., for performing the function earlier than most other types/categories of the candidate positions 360) determining the candidate positions 360 where the discretized object model 302 is adjacent to or abutting one or more edges of the previously placed objects 508 and/or a peripheral boundary/edge of the placement area 340. Also, the robotic system 100 can be configured with preferences toward determining the candidate positions 360 where the discretized object model 302 is over the previously placed objects 508 and fits within one of the objects and/or overlaps with one or more edges of the objects.

The robotic system 100 can derive the candidate positions 360 according to predetermined rules, patterns, limits, and/or sequences for placing the discretized object model 302. For example, the robotic system 100 can derive the candidate positions 360 based on a preference for the object edges, such as adjacent to and/or within a predetermined distance limit from outer-most edges of the previously placed objects 508. Also, the robotic system 100 can derive the candidate positions 360 based on a preference for outer edges/borders for the placement area 340, such as where the discretized object model 302 is nearest to or abuts the borders/edges of the pallet, cage, etc. Also, the robotic system 100 can derive the candidate positions 360 overlapping the previously placed objects 508.

At block 810, the robotic system 100 can determine/update real-time conditions of the placement area 340 of FIG. 3B, such as for 3D stacking evaluations. For example, the robotic system 100 can use the destination sensor data to determine the height measures 402 of FIG. 4. The robotic system 100 can use the depth measures derived from the destination sensor data and known height of the task location 116 and/or the sensor to calculate heights of the top surface(s) at the task location 116. The robotic system 100 can match the calculated heights to the unit pixels 310 in the discretized platform model 304 and assign the maximum calculated height within the unit pixel 310 as the corresponding height measure 402. In some embodiments, the robotic system 100 can determine the height measures 402 for the unit pixels 310 overlapped by the discretized object model 302 in the candidate positions 360.

At block 812, the robotic system 100 can evaluate the candidate positions 360. In some embodiments, the robotic system 100 can evaluate the candidate positions 360 according to real-time conditions, processing results, predetermined rules and/or parameters, or a combination thereof. For example, the robotic system 100 can evaluate the candidate positions 360 based on calculating corresponding placement scores, validating/qualifying the candidate positions 360, or a combination thereof.

At block 842, the robotic system 100 can calculate the placement score for each of the candidate positions 360. The robotic system 100 can calculate the placement score according to one or more of the placement conditions. For example, the robotic system 100 can use placement preferences (via, e.g., multiplier weights) and/or equations to describe preferences for: separation distances between packages, differences in package dimensions/fragility ratings/package weights for horizontally adjacent packages, the collision probabilities (based on, e.g., the approach paths 510 of FIG. 5 or a characteristic thereof and/or the horizontal separation 616 of FIG. 6), continuous/adjacent surfaces at the same height, a statistical result thereof (e.g., average, maximum, minimum, standard deviation, etc.), or a combination thereof. Other examples of the placement preferences can include a resulting height, a proximity measure, an edge-placement status, a maximum supportable weight, the object type, a supported weight ratio, or a combination thereof. Accordingly, in some embodiments, the robotic system 100 can include the processing weights/multipliers that represent preferences for lower maximum heights, for placing the target object 112 nearby a border of an already placed object or an edge of the placement platform, for minimizing a difference between heights and/or maximum supportable weights of adjacent objects, for reducing a ratio between supported weight and maximum supportable weight for objects overlapped by the target object 112, for matching object types for adjacent objects, or a combination thereof. Each placement location can be scored according to the preference factors and/or the equations that are predefined by a system manufacturer, an order, and/or a system operator.

In some embodiments, for example, the robotic system 100 can calculate the placement scores based on support measures for the candidate positions 360. The robotic system 100 can calculate the amount of support (e.g., in stacking objects) for one or more of the candidate positions 360 at least partially based on the height measures 402. As an illustrative example, the robotic system 100 can calculate the amount of support based on identifying the maximum height 420 of FIG. 4B for each of the candidate positions 360. Based on the maximum height 420 and the height difference threshold 416 of FIG. 4B, the robotic system 100 can calculate the lower height limit 422 of FIG. 4B for each of the candidate positions 360. The robotic system 100 can compare the height measures 402 of the candidate positions 360 to the corresponding lower height limits 422 to identify the supporting locations 442 of FIG. 4B for each of the candidate positions 360. The robotic system 100 can calculate the placement score for each of the candidate positions 360 based on the qualifying count 424 of FIG. 4B of the corresponding supporting locations 442.

In one or more embodiments, the robotic system 100 can calculate the placement scores based on deriving the support area outlines 426 of FIG. 4B for the candidate positions 360. As described above, the robotic system 100 can derive the set of the support area outlines 426 for each of the candidate positions 360 based on extending outer edges and/or connecting corners of outermost/peripheral instances of the supporting locations 442 in the corresponding position. Based on the supporting locations 442, the robotic system 100 can determine the support area size 428 of FIG. 4B and/or the support ratio 430 of FIG. 4B for calculating the placement score. Also, the robotic system 100 can calculate a lowest separation distance between the CoM location 432 and the support area outlines 426. The robotic system 100 can use the support area size 428, the support ratio 430, the lowest separation distance, corresponding preference weights, or a combination thereof to calculate the placement score for the corresponding candidate position.

In one or more embodiments, the robotic system 100 can calculate the placement scores based on deriving the approach paths 510 for the candidate positions 360 as described above. The robotic system 100 can calculate the placement score for each of the candidate positions 360 according to the final segment 606 of FIG. 6 (e.g., a length thereof), a quantity/length of one or more path segments 604 of FIG. 6, or a combination thereof. In some embodiments, the robotic system 100 can calculate the placement scores based on the horizontal separation 616 of FIG. 6 for the candidate positions 360.

In some embodiments, as illustrated at block 844, the robotic system 100 can qualify the candidate positions 360. The robotic system 100 can qualify the candidate positions 360 based on dynamically deriving a validated set of the candidate positions 360 according to one or more placement constraints. In deriving the validated set, the robotic system 100 can eliminate or disqualify instances of the candidate positions 360 that violate or fail to satisfy one or more of the placement constraints that are, at least partially, associated with the height measures 402. In one or more embodiments, the robotic system 100 can derive the validated set first and then calculate the placement scores for the validated set. In one or more embodiments, the robotic system 100 can derive the validated set concurrently with calculating the placement scores.

In one or more embodiments, the placement constraints can be associated with comparing the qualifying count 424, the set of support area outlines 426, the support area size 428, the support ratio 430, the CoM location 432, the approach paths 510, the horizontal separation 616, or a combination thereof to a threshold (e.g., the support threshold 418 of FIG. 4B) or a requirement. For example, the robotic system 100 can derive the validated set to include positions with the qualifying count 424, the support area size 428, and/or the support ratio 430 satisfying/exceeding a corresponding threshold. Also, the robotic system 100 can derive the validated set to include the positions having the CoM location 432 within/surrounded by the support area outlines 426 and/or satisfying a minimum separation distance from the support area outlines 426. Also, the robotic system 100 can derive the validated set to include the positions having the approach path 510 (e.g., the final segment 606 therein) satisfying a maximum length threshold and/or having the horizontal separation 616 satisfying a minimum threshold.

At block 814, the robotic system 100 can dynamically derive the placement location 350 for placing the target object 112 over/at the task location 116. The robotic system 100 can dynamically derive the placement location 350 based on selecting one of the positions in the validated set or the candidate positions 360 according to the placement scores. In some embodiments, the robotic system 100 can track the candidate positions 360 using a heap structure. Accordingly, the robotic system 100 can remove positions from the heap structures when the positions violate constraints as described above. Further, the robotic system 100 can sequence or rank the tracked positions according to the corresponding placement scores. In some embodiments, the robotic system 100 can continuously sequence the tracked positions as the placement scores or iterative updates of the scores are being computed. As a result, the robotic system 100 can select the position at the designated location (e.g., first slot) in the heap structure as the placement location 350 when the score computations conclude.

At block 816, the robotic system 100 can communicate information for placing the target object 112 at the derived placement location 350. In communicating the information for placing the target object 112 at the placement location 350, one or more components/devices of the robotic system 100 can communicate with and/or operate other components/devices. For example, one or more of the processors 202 and/or a stand-alone controller (such as, e.g., a warehouse/shipping center control device) can send information, such as the placement location 350, a corresponding motion plan, a set of commands and/or settings for operating the actuation devices 212 of FIG. 2 and/or the transport motor 214 of FIG. 2, or a combination thereof, to the other components/devices. The other components/devices, such as other instances of the processors 202 and/or the robotic arm 502 of FIG. 5, the actuation devices 212, the transport motor 214, and/or other external devices/systems, can receive the information and execute corresponding functions to manipulate (e.g., grip and pick up, transfer and/or reorient across space, place at destination, and/or release) the target object 112 and place it at the placement location.

At block 818, the robotic system 100 can verify placement of the target object 112 at the derived placement location. For example, the robotic system 100 can determine whether the robotic system 100, in response to the communicated information at block 816, placed the target object 112 at the derived placement location, and, if so, the robotic system 100 can determine the accuracy of the placement of the target object 112 in comparison with the derived placement location by analyzing destination sensor data. In some embodiments, the robotic system 100 can update or re-identify real-time packaging conditions after placing the target object 112. In other words, following block 818, the control flow can move to block 801 and/or 802. Accordingly, the robotic system 100 can update/identify the next incoming object as the target object 112. The robotic system 100 can also update information for placement area 340 and/or the previously placed objects 508 thereon to include the recently placed object. In other embodiments, the robotic system 100 can recalculate or adjust the packing plan and/or resume according to the packing plan after placing the target object 112 (block 801).

Discretization of the tasks and the 2D/3D layering described above provides improved efficiency, speed, and accuracy for packing objects. Accordingly, the reduction in operator inputs and the increase in accuracy can further decrease human labor for the automated packing process. In some environments, the robotic system 100 as described above can eliminate the necessity of sequencing buffers, which can cost around or over $1 million US.

Further, the dynamic computation of the placement location 350 according to real-time conditions (e.g., as represented by the sensor data and other status/data) provides reduced operational errors. As described above, the robotic system can account for and resolve errors and/or potential collisions introduced by unexpected conditions/events without requiring human intervention. Moreover, the embodiments described above can stack the objects in 3D without a pre-existing packing plan or when the unexpected conditions/event affect all or a portion of the pre-existing packing plan, such as by dynamically deriving the placement locations 350 as the objects arrive at the start location 114. In comparison to traditional systems that are limited to 2D dynamic packing (i.e., placing objects directly on the platform as a single layer), the consideration of height can allow the embodiments described above to stack the objects on top of each other and increase the packing density. In this manner, the robotic system 100 is able to identify errors and/or potential collisions and, in response, determine an appropriate action, whether it be continuing to implement a previous packing plan, salvaging a portion of the previous packing plan, generating a new packing plan, and/or dynamically deriving a placement location for the target object 112 and one or more packages subsequently scheduled to arrive at the start location 114.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms. As used herein, the phrase "and/or" as in "A and/or B" refers to A alone, B alone, and both A and B.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:
receiving source sensor data representing a target object at or approaching a start location;
analyzing the source sensor data, wherein analyzing the source sensor data includes—
determining a discretized object model based, at least in part, on the source sensor data, wherein the discretized object model represents at least one of a physical dimension or shape of the target object in two dimensions (2D) according to unit pixels, and comparing the discretized object model to at least one of a packing plan or master data, wherein the packing plan is derived prior to receiving the source sensor data, wherein the packing plan indicates placement locations and poses of objects on a task location, and further wherein the master data includes descriptions of possible objects that are pre-registered at the robotic system;

receiving destination sensor data representing a placement area associated with at least one of the task location or one or more objects previously placed on the task location;

analyzing the destination sensor data, wherein analyzing the destination sensor data includes—
- determining a discretized platform model based, at least in part, on the destination sensor data, wherein the discretized platform model represents at least one of a physical dimension or shape of the task location in 2D according to further unit pixels,
- determining height measures based, at least in part, on the destination sensor data, wherein the height measures represent maximum heights within one or more portions of the placement area corresponding to one or more sets of the further unit pixels, and
- comparing at least one of the discretized platform model or the height measures to at least one of an expected platform model or expected height measures of the placement area;

determining one or more errors, wherein determining the one or more errors includes at least one of:
(i) determining at least one source matching error by identifying one or more disparities between (a) the discretized object model and (b) at least one of the packing plan or the master data; or
(ii) determining at least one destination matching error by identifying one or more disparities between (a) at least one of the discretized platform model or the height measures and (b) at least one of the expected platform model or the expected height measures; and in response to determining the one or more errors, adjusting a placement location for the target object and/or one or more other objects based at least in part on the determined one or more errors.

2. The method of claim 1, wherein:
analyzing the source sensor data includes comparing the discretized object model to the master data, and wherein determining the one or more errors includes identifying at least one disparity between the discretized object model and the master data, and
the one or more errors include a master data error representing the master data is wrong.

3. The method of claim 1, wherein:
the packing plan specifies a sequence in which objects including the target object are to arrive at the start location;
analyzing the source sensor data includes comparing the discretized object model to the packing plan by comparing the discretized object model to a discretized object model specified by the sequence;
determining the one or more errors includes identifying at least one disparity between the discretized object model and the discretized object model specified by the sequence; and
the one or more errors include an arrival sequence error representing that the target object arrived at the start location out of the sequence specified by the packing plan.

4. The method of claim 1, wherein:
analyzing the destination sensor data includes comparing the discretized platform model to the expected platform model,
determining the one or more errors includes identifying at least one disparity between the discretized platform model and the expected platform model, and
the one or more errors include a placement accessibility error, an unexpected placement error, and/or a placement area error representing that the placement area associated with the task location differs from an expected placement area associated with the task location.

5. The method of claim 4, wherein:
determining the one or more errors further includes identifying real-time packaging conditions that pose a risk of collision,
identifying the real-time packaging conditions includes determining a placement accessibility error representing a wall of a container, cage, or car track at the task location is not fully opened such that less than all of the placement area associated with the task location is accessible to the robotic system, and
the risk of collision is a risk of collision between the robotic system and the container, cage, or car track.

6. The method of claim 1, wherein:
determining the one or more errors includes identifying at least one disparity between (a) the discretized platform model and/or the height measures and (b) the expected platform model and/or the expected height measures, respectively,
determining the one or more errors further includes identifying real-time packaging conditions that pose a risk of collision,
identifying the real-time packaging conditions includes determining an unexpected placement error representing an object of the previously placed objects on the task location shifted, fell, was displaced, or a combination thereof, and
the risk of collision is a risk of collision between the robotic system and the object of the previously placed objects on the task location.

7. The method of claim 1, wherein:
determining the one or more errors includes identifying at least one disparity between (a) the discretized platform model and/or the height measures and (b) the expected platform model and/or the expected height measures, respectively,
determining the one or more errors further includes identifying real-time packaging conditions that pose a risk of collision,
identifying the real-time packaging conditions includes determining a placement area error representing an object of the previously placed objects on the task location was misplaced, and
the risk of collision is a risk of collision between the robotic system and the object of the previously placed objects on the task location.

8. The method of claim 1, wherein:
the expected platform model and/or the expected height measures of the placement area are specified by the packing plan,
determining the one or more errors includes identifying at least one disparity between (a) the discretized platform model and/or the height measures and (b) the expected platform model and/or the expected height measures, respectively, determining the one or more errors further includes identifying real-time packaging conditions that pose a risk of collision, identifying the real-time packaging conditions includes determining a placement area error representing an object not included in the packing plan is positioned on the task location, and the risk of collision is a risk of collision between the robotic system and the object not included in the packing plan.

9. The method of claim 1, wherein:

determining the one or more errors further includes identifying real-time packaging conditions that pose a risk of collision, and identifying the real-time packaging conditions includes determining errors in the following order:

determining a placement accessibility error representing a wall of a container, cage, or car track at the task location is not fully opened such that less than all of the placement area associated with the task location is accessible to the robotic system and the risk of collision is a risk of collision between the robotic system and the container, cage, or car track at the task location;

determining an unexpected placement error representing a first object of the previously placed objects on the task location shifted, fell, was displaced, or a combination thereof such that the risk of collision is a risk of collision between the robotic system and the first object of the previously placed objects on the task location;

determining a placement area error representing a second object of the previously placed objects on the task location was misplaced such that the risk of collision is a risk of collision between the robotic system and the second object of the previously placed objects on the task location; and determining a placement area error representing a disparity between the height measures and the expected height measures such that the risk of collision is a risk of collision between the robotic system and objects contributing to the disparity between the height measures and the expected height measures, wherein the objects contributing to the disparity include (a) a third object of the previously placed objects, (b) the container, cage, or car track, and/or (c) an object not included in the packing plan but present at the task location.

10. The method of claim 1, wherein:

determining the one or more errors includes identifying at least one disparity between (a) the discretized platform model and/or the height measures and (b) the expected platform model and/or the expected height measures, respectively, and the one or more errors include a placement area error representing an object of the previously placed objects on the task location is missing at the task location.

11. The method of claim 10, wherein the one or more errors further include a transport or manipulation error representing the object of the previously placed objects was dropped while transporting the object from the source location to the task location.

12. The method of claim 1, wherein:

determining the one or more errors includes identifying at least one disparity between (a) the discretized platform model and/or the height measures and (b) the expected platform model and/or the expected height measures, respectively, and the one or more errors include a collision error representing a collision has occurred between at least two of a robotic unit of the robotic system, the target object, the previously placed objects, a container at the task location, or an object not included in the packing plan but present at the task location.

13. The method of claim 1, wherein the method of claim 1 is performed before placing the target object at the placement location for the target object specified in the packing plan.

14. The method of claim 1, further comprising:

in response to determining the one or more errors— deriving one or more candidate positions based on overlapping the discretized object model over the discretized platform model at corresponding locations;

dynamically deriving a validated set of the candidate positions according to one or more placement constraints associated with the height measures;

calculating placement scores for positions in the validated set, wherein the placement scores are calculated according to one or more placement preferences; and dynamically deriving a placement location based on selecting one of the positions in the validated set according to the placement scores, wherein the placement location is for placing the target object over the task location.

15. The method of claim 14, wherein deriving the validated set includes deriving approach paths for placing the target object at the candidate positions; and deriving the validated set based on the approach paths.

16. The method of claim 14, wherein:

adjusting the placement location for the target object includes generating information for placing the target object at the placement location over the placement area, and the method further comprises communicating the generated information for placing the target object at the placement location over the placement area.

17. The method of claim 16, further comprising:

receiving updated destination source data; and based at least in part on the updated destination source data, verifying placement accuracy of the target object at the placement location.

18. The method of claim 14, further comprising updating or replacing the packing plan based, at least in part, on at least one of the determined one or more errors or the placement location for placing the target object.

19. A robotic system comprising:

at least one sensor configured to capture destination sensor data representing a placement area associated with the task location and/or previously placed objects on the task location;

at least one processor; and at least one memory device connected to the at least one processor and having stored thereon instructions executable by the processor to:

analyze source sensor data representing a target object at or approaching a start location, wherein analyzing the source sensor data includes— determining a discretized object model based, at least in part, on the source sensor data, wherein the discretized object model represents at least one of a physical dimension or shape of the target object in two dimensions (2D) according to unit pixels, and comparing the discretized object model to at least one of a packing plan or master data, wherein the packing plan is derived prior to receiving the source sensor data, wherein the packing plan indicates placement locations and poses of objects on a task location, and further wherein the master data includes descriptions of possible objects that are pre-registered at the robotic system;

analyze destination sensor data representing a placement area associated with at least one or the task location or one or more objects previously placed on the task location, wherein analyzing the destination sensor data includes— determining a discretized platform model based, at least in part, on the destination sensor data, wherein the discretized platform model represents at least one of a physical dimension or shape of the task location in 2D according to further unit pixels, determining height measures based, at least in part, on the destination sensor data, wherein the height measures represent maximum heights within one or more portions of the placement area corresponding to one or more sets of the further unit pixels, and comparing at least one of the discretized platform model or the height measures to at least one of an expected platform model or expected height measures of the placement area;

determine one or more errors, wherein determining one or more errors includes at least one of:
(i) determining at least one source matching error by identifying one or more disparities between (a) the discretized object model and (b) the packing plan and/or the master data, or
(ii) determining at least one destination matching error by identifying one or more disparities between (a) at least one of the discretized platform model or the height measures and (b) at least one of the expected platform model or the expected height measures; and adjust a placement location for the target object and/or one or more other objects based at least in part on the determined one or more errors.

20. A tangible, non-transient computer-readable medium having processor instructions stored thereon that, when executed by a robotic system via one or more processors thereof, cause the robotic system to perform a method, the instructions comprising:

instructions to receive source sensor data representing a target object at or approaching a start location;

instructions to analyze the source sensor data, wherein the instructions to analyze the source sensor data include—
instructions to determine a discretized object model based, at least in part, on the source sensor data, wherein the discretized object model represents at least one of a physical dimension or shape of the target object in two dimensions (2D) according to unit pixels, and
instructions to compare the discretized object model to at least one of a packing plan or master data, wherein the packing plan is derived prior to receiving the source sensor data, wherein the packing plan indicates placement locations and poses of objects on a task location, and further wherein the master data includes descriptions of possible objects that are pre-registered at the robotic system;

instructions to receive destination sensor data representing a placement area associated with at least one of the task location or one or more objects previously placed on the task location;

instructions to analyze the destination sensor data, wherein the instructions to analyze the destination sensor data include—
instructions to determine a discretized platform model based, at least in part, on the destination sensor data, wherein the discretized platform model represents at least one of a physical dimension or shape of the task location in 2D according to further unit pixels,
instructions to determine height measures based, at least in part, on the destination sensor data, wherein the height measures represent maximum heights within one or more portions of the placement area corresponding to one or more sets of the further unit pixels, and
instructions to compare at least one of the discretized platform model or the height measures to at least one of an expected platform model or expected height measures of the placement area;

instructions to determine one or more errors, wherein the instructions to determine the one or more errors include at least one of:
(i) instructions to determine at least one source matching error by identifying one or more disparities between (a) the discretized object model and (b) at least one of the packing plan or the master data, or
(ii) instructions to determine at least one destination matching error by identifying one or more disparities between (a) at least one of the discretized platform model or the height measures and (b) at least one of the expected platform model or the expected height measures; and instructions to adjust a placement location for the target object and/or one or more other objects based at least in part on the determined one or more errors.

* * * * *

UNITED STATES PATENT AND TRADEMARK OFFICE
CERTIFICATE OF CORRECTION

PATENT NO. : 10,618,172 B1
APPLICATION NO. : 16/428809
DATED : April 14, 2020
INVENTOR(S) : Rosen Nikolaev Diankov et al.

It is certified that error appears in the above-identified patent and that said Letters Patent is hereby corrected as shown below:

In the Specification

In Column 1, Line 15, delete "16,428,714," and insert -- 16/428,714, --, therefor.

In Column 1, Line 21, delete "2019and" and insert -- 2019, and --, therefor.

In the Claims

In Column 43, Line 14, in Claim 19, delete "or" and insert -- of --, therefor.

Signed and Sealed this
Tenth Day of May, 2022

Katherine Kelly Vidal
*Director of the United States Patent and Trademark Office*